US010332484B2

(12) United States Patent
Chen et al.

(10) Patent No.: US 10,332,484 B2
(45) Date of Patent: Jun. 25, 2019

(54) BLUE LIGHT ADJUSTMENT METHOD, APPARATUS, AND TERMINAL

(71) Applicant: Huawei Technologies Co., Ltd., Shenzhen (CN)

(72) Inventors: Ming-Yu Chen, Shenzhen (CN); Tao Zheng, Wuhan (CN); Guo Le, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 7 days.

(21) Appl. No.: 15/509,763

(22) PCT Filed: Sep. 9, 2014

(86) PCT No.: PCT/CN2014/086129
§ 371 (c)(1),
(2) Date: Mar. 8, 2017

(87) PCT Pub. No.: WO2016/037313
PCT Pub. Date: Mar. 17, 2016

(65) Prior Publication Data
US 2017/0294175 A1    Oct. 12, 2017

(51) Int. Cl.
*G09G 5/02* (2006.01)
*G09G 5/10* (2006.01)
(Continued)

(52) U.S. Cl.
CPC .............. *G09G 5/10* (2013.01); *G06F 3/14* (2013.01); *G09G 5/006* (2013.01); *G09G 5/02* (2013.01);
(Continued)

(58) Field of Classification Search
CPC .............. G09G 5/10; G09G 2320/041; G09G 2320/0666
See application file for complete search history.

(56) References Cited

U.S. PATENT DOCUMENTS 6,078,302 A    6/2000 Suzuki
6,955,430 B2   10/2005 Pratt
(Continued)

FOREIGN PATENT DOCUMENTS

CN    203606577 U    5/2014
CN    203625298 U    6/2014
(Continued)

OTHER PUBLICATIONS

"Command scheduling with cron." Kemp, Steve. https://debian-administration.org/article/56/Command_scheduling_with_cron. Posted on Dec. 13, 2004. (Year: 2004).*
(Continued)

*Primary Examiner* — Antonio A Caschera
(74) *Attorney, Agent, or Firm* — Conley Rose, P.C.

(57) ABSTRACT

A terminal provided in the present disclosure, acquires values of one or more monitoring parameters. The terminal sets, according to the monitoring parameter, a blue light output value of a to-be-adjusted pixel displayed on a screen of the terminal when a value of at least one of the monitoring parameters meets a preset rule corresponding to the monitoring parameter, where the blue light output value is less than an original blue light output value of the to-be-adjusted pixel. The screen of the terminal displays the to-be-adjusted pixel according to the blue light output value such that the terminal can set, according to the monitoring parameter, the blue light output value of the to-be-adjusted pixel displayed on the screen of the terminal, and therefore the blue light can be adjusted intelligently, and an objective of vision protection without affecting user experience is achieved.

19 Claims, 11 Drawing Sheets

(51) Int. Cl.
*G06F 3/14* (2006.01)
*G09G 5/00* (2006.01)
(52) U.S. Cl.
CPC ............... *G09G 2320/029* (2013.01); *G09G 2320/0261* (2013.01); *G09G 2320/06* (2013.01); *G09G 2320/0666* (2013.01); *G09G 2320/08* (2013.01); *G09G 2340/14* (2013.01); *G09G 2354/00* (2013.01); *G09G 2360/144* (2013.01)

(56) References Cited

U.S. PATENT DOCUMENTS

| | | | |
|---|---|---|---|
| 2006/0152525 A1 | 7/2006 | Woog | |
| 2009/0231248 A1* | 9/2009 | Dorff | H04M 1/0283 345/83 |
| 2010/0264850 A1* | 10/2010 | Yamamoto | G09G 5/14 315/312 |

FOREIGN PATENT DOCUMENTS

| | | |
|---|---|---|
| CN | 104007950 A | 8/2014 |
| EP | 2937035 A1 | 10/2015 |
| JP | H11341393 A | 12/1999 |
| WO | 2013186972 A1 | 12/2013 |
| WO | 2014096477 A1 | 6/2014 |

OTHER PUBLICATIONS

Foreign Communication From a Counterpart Application, European Application No. 14901637.0, Extended European Search Report dated Aug. 28, 2017, 8 pages.
Machine Translation and Abstract of Chinese Publication No. CN104007950, Aug. 27, 2014, 9 pages.
Machine Translation and Abstract of Chinese Publication No. CN203625298, Jun. 4, 2014, 11 pages.
Machine Translation and Abstract of Japanese Publication No. JPH11341393, Dec. 10, 1999, 13 pages.
Foreign Communication From a Counterpart Application, PCT Application No. PCT/CN2014/086129, English Translation of International Search Report dated Apr. 29, 2015, 2 pages.
Foreign Communication From a Counterpart Application, PCT Application No. PCT/CN2014/086129, English Translation of Written Opinion dated Apr. 29, 2015, 10 pages.
Foreign Communication From a Counterpart Application, European Application No. 14901637.0, European Office Action dated Dec. 6, 2018, 11 pages.

* cited by examiner

BLUE LIGHT ADJUSTMENT METHOD, APPARATUS, AND TERMINAL

CROSS-REFERENCE TO RELATED APPLICATION

This application is a U.S. national stage of International Patent Application No. PCT/CN2014/086129 filed on Sep. 9, 2014, which is hereby incorporated by reference in its entirety.

TECHNICAL FIELD

The present disclosure relates to mobile communications technologies, and in particular, to a blue light adjustment method, apparatus, and terminal.

BACKGROUND

A macula of a human eye is located in a center area of a retina and has a close relationship with vision. After the macula degenerates, a problem such as blurred vision occurs on the human eye, or even a loss of vision is caused in a severe case. A yellow pigment in the macula absorbs blue light and causes a photochemical oxidation reaction. Therefore, when the human eye receives irradiation of the blue light for a long time, the retina of the human eye will be injured.

As electronic devices gain popularity, people spend increasing time in using the electronic devices. Therefore, damage to a human eye brought by the electronic devices becomes increasingly unignorable. Therefore, application software for reducing blue light output emerges. However, such application software requires a user to manually start a corresponding application program to enable an eye protection function, and all pixels on a display screen of an electronic device are adjusted only according to a defined manner.

An optical light filter and an optical lens that reduce blue light output are also available on the market. The optical light filter or the optical lens is attached to a display screen of an apparatus or attached to eyeglasses of a user. However, such a light filter also has the foregoing problem, that is, an objective of eye protection can be achieved only using the light filter or the optical lens, and all light irradiating at a human eye can be controlled only according to a defined manner.

In conclusion, how the terminal intelligently adjusts blue light is a problem that needs to be urgently resolved.

SUMMARY

In view of this, embodiments of the present disclosure provide a blue light adjustment method, apparatus, and terminal such that blue light can be adjusted intelligently, and an objective of vision protection without affecting user experience is achieved.

According to a first aspect, an embodiment of the present disclosure provides a blue light adjustment method, including acquiring, by a terminal, values of one or more monitoring parameters, setting, by the terminal according to the monitoring parameter, a blue light output value of a to-be-adjusted pixel displayed on a screen of the terminal when a value of at least one of the monitoring parameters meets a preset rule corresponding to the monitoring parameter, where the blue light output value is less than an original blue light output value of the to-be-adjusted pixel, and displaying, by the screen of the terminal, the to-be-adjusted pixel according to the blue light output value.

In a first possible implementation manner of the first aspect, the method further includes monitoring an application program currently running on a foreground of the terminal, and setting the blue light output value to the original blue light output value of the to-be-adjusted pixel when the application program is in a preset application program list or when none of the values of the one or more monitoring parameters meets the preset rule corresponding to the monitoring parameter.

With reference to the first aspect or the first possible implementation manner of the first aspect, in a second possible implementation manner of the first aspect, setting, by the terminal according to the monitoring parameter, a blue light output value of a to-be-adjusted pixel displayed on a screen of the terminal includes determining, by the terminal, a first adjustment parameter according to the monitoring parameter, and setting, by the terminal, the blue light output value of the to-be-adjusted pixel according to the first adjustment parameter such that the blue light output value is less than the original blue light output value of the to-be-adjusted pixel.

According to the second possible implementation manner of the first aspect, in a third possible implementation manner of the first aspect, the setting, by the terminal, the blue light output value of the to-be-adjusted pixel according to the first adjustment parameter further includes setting, by the terminal, the blue light output value of the to-be-adjusted pixel according to Pout(x)=A*Pin(x), where A indicates the first adjustment parameter, Pin(x) indicates the original blue light output value of the to-be-adjusted pixel, Pout(x) indicates the blue light output value of the to-be-adjusted pixel, and 0<A<1.

According to the second possible implementation manner of the first aspect, in a fourth possible implementation manner of the first aspect, after determining, by the terminal, a first adjustment parameter according to the monitoring parameter, the method further includes determining, by the terminal, a second adjustment parameter according to the first adjustment parameter, and setting, by the terminal, the blue light output value of the to-be-adjusted pixel according to the first adjustment parameter includes setting, by the terminal, the blue light output value of the to-be-adjusted pixel according to the first adjustment parameter and the second adjustment parameter such that the blue light output value of the to-be-adjusted pixel is closer to the original blue light output value of the to-be-adjusted pixel when the original blue light output value of the to-be-adjusted pixel is smaller.

According to the fourth implementation manner of the first aspect, in a fifth possible implementation manner of the first aspect, setting, by the terminal, the blue light output value of the to-be-adjusted pixel according to the first adjustment parameter and the second adjustment parameter further includes setting, by the terminal, the blue light output value of the to-be-adjusted pixel according to $Pout(x)=A*Pin(x)+A*Pin(x)*(1-Pin(x)^{1/G})$, where A indicates the first adjustment parameter, G indicates the second adjustment parameter, Pin(x) indicates the original blue light output value of the to-be-adjusted pixel, Pout(x) indicates the blue light output value of the to-be-adjusted pixel, 0<A<1, and 1<G<10.

With reference to the first aspect or the first possible implementation manner of the first aspect, in a sixth possible implementation manner of the first aspect, setting, by the terminal according to the monitoring parameter, a blue light output value of a to-be-adjusted pixel displayed on a screen of the terminal further includes setting, by the terminal, the blue light output value of the to-be-adjusted pixel according to a preset third adjustment parameter such that the blue light output value is less than the original blue light output value of the to-be-adjusted pixel.

With reference to the first aspect and the foregoing possible implementation manners of the first aspect, in a seventh possible implementation manner of the first aspect, the to-be-adjusted pixel displayed on the screen of the terminal further includes all pixels displayed on the screen of the terminal, or some pixels displayed on the screen of the terminal.

With reference to the first aspect and the foregoing possible implementation manners, in an eighth possible implementation manner of the first aspect, the one or more monitoring parameters include one or a combination of more than one of the following parameters, such as duration (where the duration indicates a time length of a continuous awake state of the screen of the terminal), ambient light luminance of the terminal, a distance between an eye of a user and the screen of the terminal, system time of the terminal, a quantity of times the eye of the user closes per unit time, a motion status of the terminal, or the original blue light output value of the to-be-adjusted pixel.

According to a second aspect, a blue light adjustment apparatus is provided, where the apparatus includes a monitoring parameter acquiring module, a blue light setting module, a display module, and a storage module, where the monitoring parameter acquiring module is configured to acquire values of one or more monitoring parameters. The blue light setting module is configured for the apparatus to set, when a value, of at least one of the monitoring parameters, acquired by the monitoring parameter acquiring module meets a preset rule that corresponds to the monitoring parameter and that is stored in the storage module, a blue light output value of a to-be-adjusted pixel according to the monitoring parameter, where the blue light output value is less than an original blue light output value of the to-be-adjusted pixel. The display module is configured to display the to-be-adjusted pixel according to the blue light output value set by the blue light setting module, and the storage module is configured to store the preset rule corresponding to the monitoring parameter.

According to the second aspect, in a first possible implementation manner of the second aspect, the apparatus further includes an application program monitoring module configured to monitor an application program currently running on a foreground of the apparatus. The storage module is further configured to store a preset application program list, and the blue light setting module is further configured to set the blue light output value to the original blue light output value of the to-be-adjusted pixel when the application program acquired by the application program monitoring module is in the preset application program list stored in the storage module or when none of the values, of the one or more monitoring parameters, acquired by the monitoring parameter acquiring module meets the preset rule that corresponds to the monitoring parameter and that is stored in the storage module.

With reference to the second aspect or the first possible implementation manner of the second aspect, in a second possible implementation manner of the second aspect, the blue light setting module further includes a first adjustment parameter determining unit configured to determine a first adjustment parameter according to the monitoring parameter acquired by the monitoring parameter acquiring module, and a blue light setting unit configured to set the blue light output value of the to-be-adjusted pixel according to the first adjustment parameter determined by the first adjustment parameter determining unit such that the blue light output value is less than the original blue light output value of the to-be-adjusted pixel.

According to the second possible implementation manner of the second aspect, in a third possible implementation manner of the second aspect, the blue light setting unit is further configured to set the blue light output value of the to-be-adjusted pixel according to $Pout(x)=A*Pin(x)$, where A indicates the first adjustment parameter, $Pin(x)$ indicates the original blue light output value of the to-be-adjusted pixel, $Pout(x)$ indicates the blue light output value of the to-be-adjusted pixel, and $0<A<1$.

According to the second possible implementation manner of the second aspect, in a fourth possible implementation manner of the second aspect, the blue light setting module further includes a second adjustment parameter determining unit configured to determine a second adjustment parameter according to the first adjustment parameter determined by the first adjustment parameter determining unit, and the blue light setting unit is further configured to set the blue light output value of the to-be-adjusted pixel according to the first adjustment parameter determined by the first adjustment parameter determining unit and the second adjustment parameter determined by the second adjustment parameter determining unit such that the blue light output value of the to-be-adjusted pixel is closer to the original blue light output value of the to-be-adjusted pixel when the original blue light output value of the to-be-adjusted pixel is smaller.

According to the fourth possible implementation manner of the second aspect, in a fifth possible implementation manner of the second aspect, the blue light setting unit is further configured to set the blue light output value of the to-be-adjusted pixel according to $Pout(x)=A*Pin(x)+A*Pin(x)*(1-Pin(x)^{1/G})$, where A indicates the first adjustment parameter, G indicates the second adjustment parameter, $Pin(x)$ indicates the original blue light output value of the to-be-adjusted pixel, $Pout(x)$ indicates the blue light output value of the to-be-adjusted pixel, $0<A<1$, and $1<G<10$.

With reference to the second aspect and the first possible implementation manner of the second aspect, in a sixth possible implementation manner of the second aspect, the storage module is further configured to store a preset third adjustment parameter, and the blue light setting module is further configured to set the blue light output value of the to-be-adjusted pixel according to the preset third adjustment parameter such that the blue light output value is less than the original blue light output value of the to-be-adjusted pixel.

With reference to the second aspect and the foregoing possible implementation manners of the second aspect, in a seventh possible implementation manner of the second aspect, the to-be-adjusted pixel displayed on the display module further includes all pixels displayed on the display module, or some pixels displayed on the display module.

With reference to the second aspect and the foregoing possible implementation manners of the second aspect, in an eighth possible implementation manner of the second aspect, the one or more monitoring parameters include one or a combination of more than one of the following parameters, such as duration (where the duration indicates a time length of a continuous awake state of the display module), ambient light luminance, a distance between an eye of a user and the display module, system time of the apparatus, a quantity of times the eye of the user closes per unit time, a motion status of the apparatus, or the original blue light output value of the to-be-adjusted pixel.

According to a third aspect, a blue light adjustment terminal is provided, including a monitoring parameter acquiring apparatus configured to acquire values of one or more monitoring parameters, a processor configured to set, when a value, of at least one of the monitoring parameters, acquired by the monitoring parameter acquiring apparatus meets a preset rule corresponding to the monitoring parameter, a blue light output value of a to-be-adjusted pixel according to the monitoring parameter, where the blue light output value is less than an original blue light output value of the to-be-adjusted pixel, a display apparatus configured to display the to-be-adjusted pixel according to the blue light output value, and a memory configured to store the preset rule corresponding to the monitoring parameter.

According to the third aspect, in a first possible implementation manner of the third aspect, the memory is further configured to store a preset application program list, and the processor is further configured to monitor an application program currently running on a foreground of the terminal, and set the blue light output value to the original blue light output value of the to-be-adjusted pixel when the application program is in the preset application program list stored in the memory or when none of the values, of the one or more monitoring parameters, acquired by the monitoring parameter acquiring apparatus meets the preset rule corresponding to the monitoring parameter.

With reference to the third aspect or the first possible implementation manner of the third aspect, in a second possible implementation manner of the third aspect, the processor is further configured to determine a first adjustment parameter according to the monitoring parameter, and set the blue light output value of the to-be-adjusted pixel according to the first adjustment parameter such that the blue light output value is less than the original blue light output value of the to-be-adjusted pixel.

According to the second possible implementation manner of the third aspect, in a third possible implementation manner of the third aspect, the processor is further configured to set the blue light output value of the to-be-adjusted pixel according to $Pout(x)=A*Pin(x)$, where A indicates the first adjustment parameter, $Pin(x)$ indicates the original blue light output value of the to-be-adjusted pixel, $Pout(x)$ indicates the blue light output value of the to-be-adjusted pixel, and $0<A<1$.

According to the second possible implementation manner of the third aspect, in a fourth possible implementation manner of the third aspect, the processor is further configured to determine a second adjustment parameter according to the first adjustment parameter, and the processor is further configured to set the blue light output value of the to-be-adjusted pixel according to the first adjustment parameter and the second adjustment parameter such that the blue light output value of the to-be-adjusted pixel is closer to the original blue light output value of the to-be-adjusted pixel when the original blue light output value of the to-be-adjusted pixel is smaller.

According to the third possible implementation manner of the third aspect, in a fifth possible implementation manner of the third aspect, the processor is further configured to set the blue light output value of the to-be-adjusted pixel according to $Pout(x)=A*Pin(x)+A*Pin(x)*(1-Pin(x)^{1/G})$, where A indicates the first adjustment parameter, G indicates the second adjustment parameter, $Pin(x)$ indicates the original blue light output value of the to-be-adjusted pixel, $Pout(x)$ indicates the blue light output value of the to-be-adjusted pixel, $0<A<1$, and $1<G<10$.

With reference to the third aspect or the first possible implementation manner of the third aspect, in a sixth possible implementation manner of the third aspect, the processor is further configured to set the blue light output value of the to-be-adjusted pixel according to a preset third adjustment parameter such that the blue light output value is less than the original blue light output value of the to-be-adjusted pixel.

According to the third aspect and the foregoing possible implementation manners of the third aspect, in a seventh possible implementation manner of the third aspect, the to-be-adjusted pixel displayed on the display apparatus of the terminal further includes all pixels displayed on the display apparatus of the terminal, or some pixels displayed on the display apparatus of the terminal.

According to the third aspect and the foregoing possible implementation manners of the third aspect, in an eighth possible implementation manner of the third aspect, the one or more monitoring parameters include one or a combination of more than one of the following parameters, such as duration (where the duration indicates a time length of a continuous awake state of a screen of the terminal), ambient light luminance of the terminal, a distance between an eye of a user and the screen of the terminal, system time of the terminal, a quantity of times the eye of the user closes per unit time, a motion status of the terminal, or the original blue light output value of the to-be-adjusted pixel.

According to the blue light adjustment method, apparatus, and terminal provided in the embodiments of the present disclosure, the values of the one or more monitoring parameters are acquired, the terminal sets, according to the monitoring parameter, the blue light output value of the to-be-adjusted pixel displayed on the screen of the terminal when a value of at least one of the monitoring parameters meets a preset rule corresponding to the monitoring parameter, where the blue light output value is less than the original blue light output value of the to-be-adjusted pixel, the screen of the terminal displays the to-be-adjusted pixel according to the blue light output value such that the terminal can determine, according to the value of the monitoring parameter, whether to adjust blue light of the screen of the terminal, and set, according to the monitoring parameter, the blue light output value of the to-be-adjusted pixel displayed on the screen of the terminal, and therefore the blue light can be adjusted intelligently, and an objective of vision protection without affecting user experience is achieved.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show some embodiments of the present disclosure, and persons of ordinary skill in the art may still derive other drawings from these accompanying drawings without creative efforts.

DESCRIPTION OF EMBODIMENTS

Figure 1:
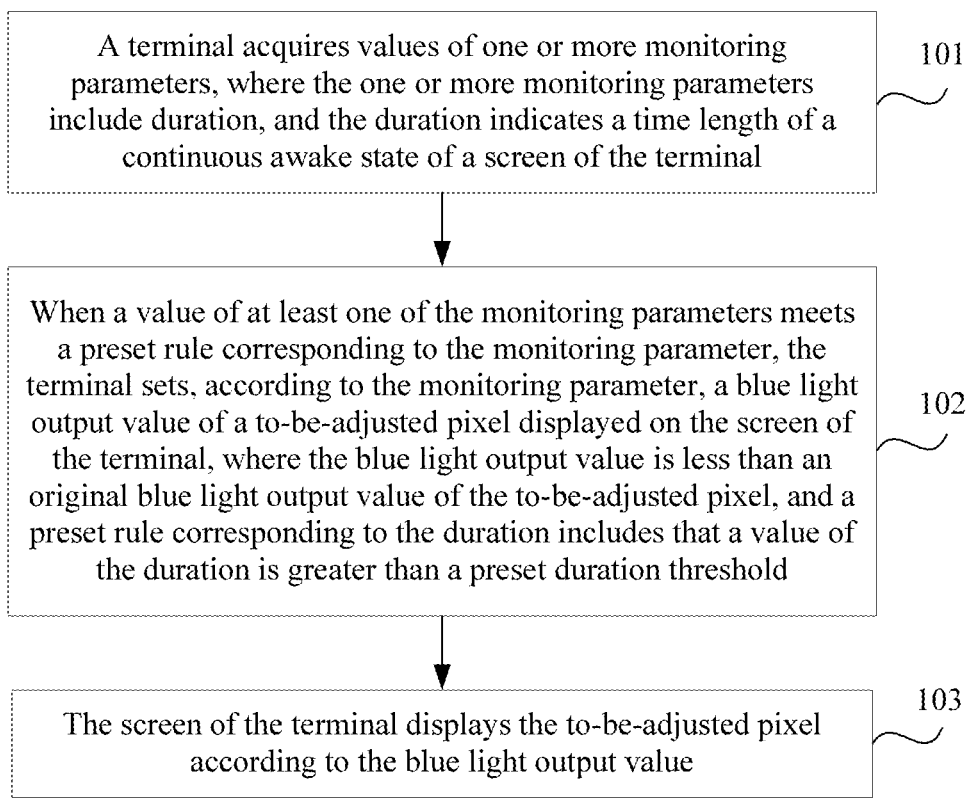
FIG. 1 is a flowchart of a blue light adjustment method according to an embodiment of the present disclosure.

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

The embodiments of the present disclosure are executed by a terminal. The terminal may be a fixed terminal, for example, a desktop computer or a television, or may be a mobile terminal, for example, a tablet computer or a mobile phone, or may even be a projector or a wearable device, for example, a GOOGLE GLASS.

Step 001: A terminal acquires values of one or more monitoring parameters.

The terminal acquires the one or more monitoring parameters to determine whether to start a blue light adjustment step, provided that the monitoring parameters can be used as a basis for determining blue light adjustment.

Optionally, the one or more monitoring parameters include one or a combination of more than one of the following parameters, such as duration (where the duration indicates a time length of a continuous awake state of a screen of the terminal), ambient light luminance of the terminal, a distance between an eye of a user and the screen of the terminal, system time of the terminal, a quantity of times the eye of the user closes per unit time, a motion status of the terminal, or an original blue light output value of a to-be-adjusted pixel displayed on the screen of the terminal. For example, the one or more monitoring parameters may include the duration, or the ambient light luminance of the terminal, or the distance between the eye of the user and the screen of the terminal, or the system time of the terminal, or the quantity of times the eye of the user closes per unit time, or the motion status of the terminal, or the original blue light output value of the to-be-adjusted pixel displayed on the screen of the terminal, or the one or more monitoring parameters may include the duration and the ambient light luminance of the terminal, or the one or more monitoring parameters may include the duration and the distance between the eye of the user and the screen of the terminal, or the one or more monitoring parameters may include the duration and the system time of the terminal, or the one or more monitoring parameters may include the duration and the quantity of times the eye of the user closes per unit time, or the one or more monitoring parameters may include the duration and the motion status of the terminal, or the one or more monitoring parameters may include the duration and the original blue light output value of the to-be-adjusted pixel displayed on the screen of the terminal. No more examples are provided herein.

Step 002: The terminal sets, according to the monitoring parameter, a blue light output value of a to-be-adjusted pixel displayed on a screen of the terminal when a value of at least one of the monitoring parameters meets a preset rule corresponding to the monitoring parameter, where the blue light output value is less than an original blue light output value of the to-be-adjusted pixel.

Step 003: The screen of the terminal displays the to-be-adjusted pixel according to the blue light output value.

According to the blue light adjustment method provided in this embodiment of the present disclosure, the terminal acquires the values of the one or more monitoring parameters, the terminal sets, according to the monitoring parameter, the blue light output value of the to-be-adjusted pixel displayed on the screen of the terminal when a value of at least one of the monitoring parameters meets a preset rule corresponding to the monitoring parameter, where the blue light output value is less than the original blue light output value of the to-be-adjusted pixel. The screen of the terminal displays the to-be-adjusted pixel according to the blue light output value such that the terminal can determine, according to the value of the monitoring parameter, whether to adjust blue light of the screen of the terminal, and set, according to the monitoring parameter, the blue light output value of the to-be-adjusted pixel displayed on the screen of the terminal, and therefore the blue light can be adjusted intelligently, and an objective of vision protection without affecting user experience is achieved.

FIG. 1 is a flowchart of a blue light adjustment method according to an embodiment of the present disclosure. As shown in FIG. 1, the method in this embodiment of the present disclosure includes the following steps.

Step 101: A terminal acquires values of one or more monitoring parameters, where the one or more monitoring parameters include duration, and the duration indicates a time length of a continuous awake state of a screen of the terminal.

It should be noted that the terminal may acquire, after start-up, the values of the monitoring parameters in real time or periodically, or may acquire, after an application program related to this embodiment of the present disclosure is executed, the values of the monitoring parameters in real time or periodically.

It should be noted that the terminal may acquire the values of the monitoring parameters using hardware of the terminal or software, or the terminal may acquire the values of the monitoring parameters using a device, except hardware of the terminal or software, for example, by receiving a value, of a monitoring parameter, acquired by a wearable device.

The terminal acquires the one or more monitoring parameters to determine whether to start a blue light adjustment step, provided that the monitoring parameters can be used as a basis for determining whether to start blue light adjustment.

It should be noted that the continuous awake state refers to that the screen of the terminal is in a continuous lighted-up state, that is, the screen of the terminal is not lighted out during a period in which the screen of the terminal is in a lighted-up state. In specific implementation, a timer may be provided on the terminal. The timer starts timing when the screen of the terminal is wakened, and the timer stops timing when the screen of the terminal is lighted out. A duration value obtained by the timer by performing timing in a period from starting timing to stopping timing is set as a value of the duration. The duration value is cleared after the screen of the terminal is lighted out, and the timer re-calculates a time length of continuous operation of the screen of the terminal, or may calculate a value of the duration in another manner when the screen of the terminal is wakened again. This embodiment of the present disclosure does not impose a specific limitation.

Optionally, the one or more monitoring parameters further include one or a combination of more than one of the following parameters ambient light luminance, a distance between an eye of a user and the screen of the terminal, system time of the terminal, a quantity of times the eye of the user closes per unit time, a motion status of the terminal, or an original blue light output value of a to-be-adjusted pixel displayed on the screen of the terminal. For example, the one or more monitoring parameters may include the duration and the ambient light luminance of the terminal, or the one or more monitoring parameters may include the duration and the distance between the eye of the user and the screen of the terminal, or the one or more monitoring parameters may include the duration and the system time of the terminal, or the one or more monitoring parameters may include the duration and the quantity of times the eye of the user closes per unit time, or the one or more monitoring parameters may include the duration and the motion status of the terminal, or the one or more monitoring parameters may include the duration and the original blue light output value of the to-be-adjusted pixel displayed on the screen of the terminal. No more examples are provided herein.

Step 102: When a value of at least one of the monitoring parameters meets a preset rule corresponding to the monitoring parameter, the terminal sets, according to the monitoring parameter, a blue light output value of a to-be-adjusted pixel displayed on the screen of the terminal, where the blue light output value is less than an original blue light output value of the to-be-adjusted pixel, and a preset rule corresponding to the duration includes that a value of the duration is greater than a preset duration threshold.

It should be noted that the preset duration threshold is a duration value preset on the terminal, and the preset duration threshold may be set to a preferred duration value obtained by performing an experimental test and may be set before the terminal is delivered, or an interface for editing the preset duration threshold may be provided on the terminal such that a user can set or modify the preset duration threshold on the editing interface. A specific implementation manner to be used may be further defined according to an actual requirement, and this embodiment of the present disclosure does not impose a specific limitation.

It should be noted that, if the screen of the terminal uses hardware with adjustable backlight, blue light output of a to-be-adjusted pixel may be adjusted by adjusting a backlight source. In this way, adjustment may be performed on a light source that emits light, which may reduce power consumption of the terminal. Certainly, a filter of the terminal may be enabled to adjust blue light output of a to-be-adjusted pixel, and this manner is more flexible, more careful, and easy to implement, and an adjustment result may be accurate to a specific pixel.

Optionally, the to-be-adjusted pixel displayed on the screen of the terminal further includes all pixels displayed on the screen of the terminal, or some pixels displayed on the screen of the terminal.

The terminal may adjust all pixels displayed on the screen of the terminal, or may identify some to-be-adjusted pixels displayed on the screen of the terminal, adjust the to-be-adjusted pixels, and display another pixel according to an original value. A specific implementation manner to be used may be defined according to an actual requirement, and this embodiment of the present disclosure does not impose a specific limitation. For example, the terminal identifies, as a to-be-adjusted pixel, a pixel in a text (a black text on a white background, or a white text on a black background) area displayed on the screen of the terminal.

Optionally, when the one or more monitoring parameters include the ambient light luminance, a preset rule corresponding to the ambient light luminance includes that an acquired value of the ambient light luminance is less than a preset ambient light threshold. The preset ambient light threshold is an ambient light luminance value preset on the terminal, and the preset ambient light threshold may be set to a preferred ambient light luminance value obtained by performing an experimental test and may be set before the terminal is delivered, or an interface for editing the preset ambient light threshold may be provided on the terminal such that the user can set or modify the preset ambient light threshold on the editing interface. A specific implementation manner to be used may be defined according to an actual requirement, and this embodiment of the present disclosure does not impose a specific limitation.

Optionally, when the one or more monitoring parameters include the distance between the eye of the user and the screen of the terminal, a preset rule corresponding to the distance between the eye of the user and the screen of the terminal includes that an acquired value of the distance between the eye of the user and the screen of the terminal is less than a preset distance threshold. The terminal may use a camera, a sensor, or the like to monitor a value of the distance between the eye of the user and the screen of the terminal. In specific implementation, a distance between the camera and the eye of the user may be monitored, or a vertical distance between the screen of the terminal and the eye of the user may be monitored. This embodiment of the present disclosure does not impose a specific limitation on a specific manner to be used. The preset distance threshold is a distance value preset on the terminal, and the preset distance threshold may be set to a preferred distance value obtained by performing an experimental test and may be set before the terminal is delivered, or an interface for editing the preset distance threshold may be provided on the terminal such that the user can set or modify the preset distance threshold on the editing interface. A specific implementation manner to be used may be defined according to an actual requirement, and this embodiment of the present disclosure does not impose a specific limitation.

Optionally, when the one or more monitoring parameters include the system time, a preset rule corresponding to the system time includes that the acquired system time is within the preset time period. The preset time period includes a time period preset by the user or a sunset time period acquired by the terminal from a network. That is, the preset time period may be a time period preset by the user on the terminal, and the preset time period may be set to a preferred time period obtained by performing an experimental test and may be set before the terminal is delivered, or an interface for editing the preset time period may be provided on the terminal such that the user can set or modify the preset time period on the editing interface, or the preset time period may be the sunset time period acquired by the terminal from the network, and the terminal periodically connects to the network to acquire an updated sunset time period. A specific implementation manner to be used may be further defined according to an actual requirement, and this embodiment of the present disclosure does not impose a specific limitation.

Optionally, when the one or more monitoring parameters include the quantity of times the eye of the user closes per unit time, a preset rule corresponding to the quantity of times the eye of the user closes per unit time includes that an acquired value of the quantity of times the eye of the user closes per unit time is greater than a preset threshold of eye closing times. The preset threshold of eye closing times is a value of eye closing times preset on the terminal, and the preset threshold of eye closing times may be set to a preferred value of eye closing times obtained by performing an experimental test and may be set before the terminal is delivered, or an interface for editing the preset threshold of eye closing times may be provided on the terminal such that the user can set or modify the preset threshold of eye closing times on the editing interface. A specific implementation manner to be used may be defined according to an actual requirement, and this embodiment of the present disclosure does not impose a specific limitation.

Optionally, a preset rule corresponding to the motion status of the terminal includes that an acquired motion status of the terminal is a moving state when the one or more monitoring parameters include the motion status of the terminal. The terminal may monitor the motion status of the terminal using a sensor.

Optionally, a preset rule corresponding to the original blue light output value includes that the acquired original blue light output value is greater than a preset blue light threshold when the one or more monitoring parameters include the original blue light output value of the to-be-adjusted pixel displayed on the screen of the terminal. The preset blue light threshold is a blue light value preset on the terminal, and the preset blue light threshold may be set to a preferred blue light value obtained by performing an experimental test and may be set before the terminal is delivered, or an interface for editing the preset blue light threshold may be provided on the terminal such that the user can set or modify the preset blue light threshold on the editing interface. A specific implementation manner to be used may be defined according to an actual requirement, and this embodiment of the present disclosure does not impose a specific limitation.

It should be noted that, when the one or more monitoring parameters include two or more monitoring parameters, after acquiring values of the two or more monitoring parameters, the terminal needs to determine whether the values of the two or more monitoring parameters meet preset rules corresponding to the monitoring parameters, and when one of the monitoring parameters meets a preset rule corresponding to the monitoring parameter (it is not required that the values of all the monitoring parameters meet the preset rules corresponding to the monitoring parameters), the terminal sets, according to the monitoring parameter, a blue light output value of a to-be-adjusted pixel displayed on the screen of the terminal. There may be multiple specific implementation manners. For example, the terminal may first acquire the values of all the monitoring parameters, and then compare the acquired values with the preset rules one by one, that is, first acquire the values of all the monitoring parameters, and then perform a comparison operation between an acquired value of a monitoring parameter and a preset rule, and provided that one of the monitoring parameters meets a preset rule corresponding to the monitoring parameter, the terminal sets, according to the monitoring parameter, a blue light output value of a to-be-adjusted pixel displayed on the screen of the terminal, or the terminal may perform a comparison operation after acquiring a value of one monitoring parameter, that is, acquire the values of the monitoring parameters according to a priority order, and after acquiring a value of one monitoring parameter, perform a comparison operation between the acquired value of the monitoring parameter and a preset rule, and when the acquired value of the monitoring parameter meets the preset rule, stop acquiring and performing a comparison operation on a value of a remaining monitoring parameter, and the terminal sets, according to the monitoring parameter, a blue light output value of a to-be-adjusted pixel displayed on the screen of the terminal. In this way, the blue light output value of the to-be-adjusted pixel is set provided that a value of one monitoring parameter meets a preset rule, without a need to acquire all the monitoring parameters, and also without a need to complete comparison operations between all the monitoring parameters and the preset rules, and therefore the terminal can quickly adjust blue light of a to-be-adjusted pixel, which effectively reduces resource consumption of the terminal and improves operation experience of a terminal user.

Step 103: The screen of the terminal displays the to-be-adjusted pixel according to the blue light output value.

It should be noted that when the screen of the terminal displays a pixel, not only blue light is included, but also light in another color is included. The light in another color is irrelevant to this embodiment of the present disclosure, and therefore only blue light is mentioned when a specific solution is described and description of the light in another color is ignored.

According to the blue light adjustment method provided in this embodiment of the present disclosure, the terminal acquires the values of the one or more monitoring parameters, where the one or more monitoring parameters include the duration, and the duration indicates a time length of a continuous awake state of the screen of the terminal. The terminal sets, according to the monitoring parameter, the blue light output value of the to-be-adjusted pixel displayed on the screen of the terminal when a value of at least one of the monitoring parameters meets a preset rule corresponding to the monitoring parameter, where the blue light output value is less than the original blue light output value of the to-be-adjusted pixel, and the preset rule corresponding to the duration includes that the value of the duration is greater than the preset duration threshold. The screen of the terminal displays the to-be-adjusted pixel according to the blue light output value such that the terminal can determine, according to the value of the monitoring parameter, whether to adjust blue light of the screen of the terminal, and set, according to the monitoring parameter, the blue light output value of the to-be-adjusted pixel displayed on the screen of the terminal, and therefore the blue light can be adjusted intelligently, and an objective of vision protection without affecting user experience is achieved.

Figure 2:
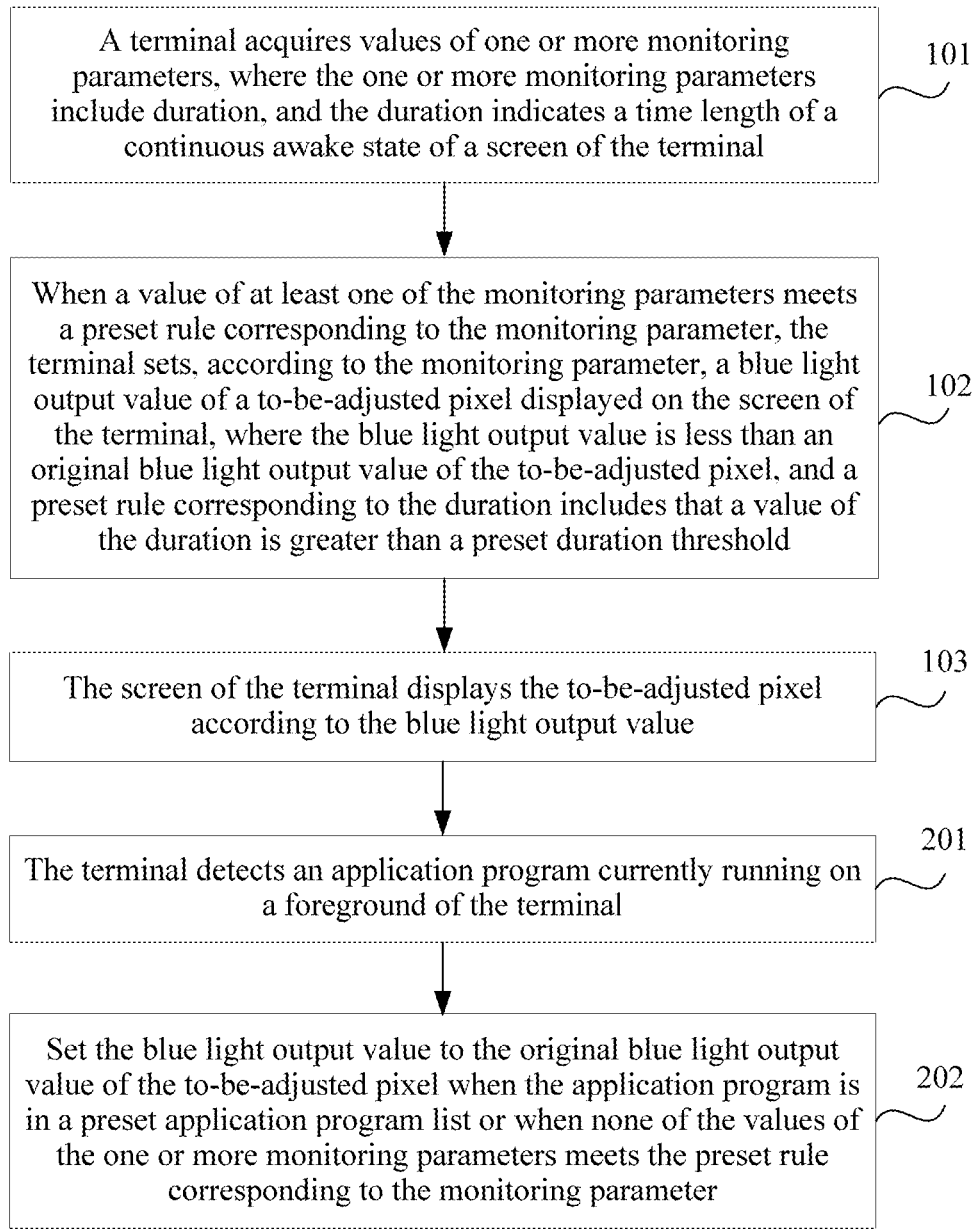
FIG. 2 is a flowchart of a blue light adjustment method according to another embodiment of the present disclosure.

FIG. 2 is a flowchart of a blue light adjustment method according to another embodiment of the present disclosure. This embodiment of the present disclosure is implemented based on the embodiment shown in FIG. 1. As shown in FIG. 2, the method further includes the following steps.

Step 201: The terminal detects an application program currently running on a foreground of the terminal.

Step 202: Set the blue light output value to the original blue light output value of the to-be-adjusted pixel when the application program is in a preset application program list or when none of the values of the one or more monitoring parameters meets the preset rule corresponding to the monitoring parameter.

It should be noted that the preset application program list is stored in the terminal, and an application program that has a relatively high pixel output quality requirement is stored in this preset application program list, for example, a video player or a photo player.

The blue light output value is set to the original blue light output value of the to-be-adjusted pixel, that is, adjustment on blue light of the to-be-adjusted pixel is stopped when the application program is in the preset application program list.

The blue light output value is set to the original blue light output value of the to-be-adjusted pixel, that is, adjustment on blue light of the to-be-adjusted pixel is stopped when none of the values of the monitoring parameters meets the preset rule corresponding to the monitoring parameter.

According to the blue light adjustment method provided in this embodiment of the present disclosure, a condition for stopping blue light adjustment is set, and the terminal automatically determines whether blue light adjustment needs to be stopped such that the terminal can intelligently stop blue light adjustment when blue light adjustment is unsuitable or blue light adjustment is not required, and an objective of vision protection without affecting user experience is achieved.

Figure 3:
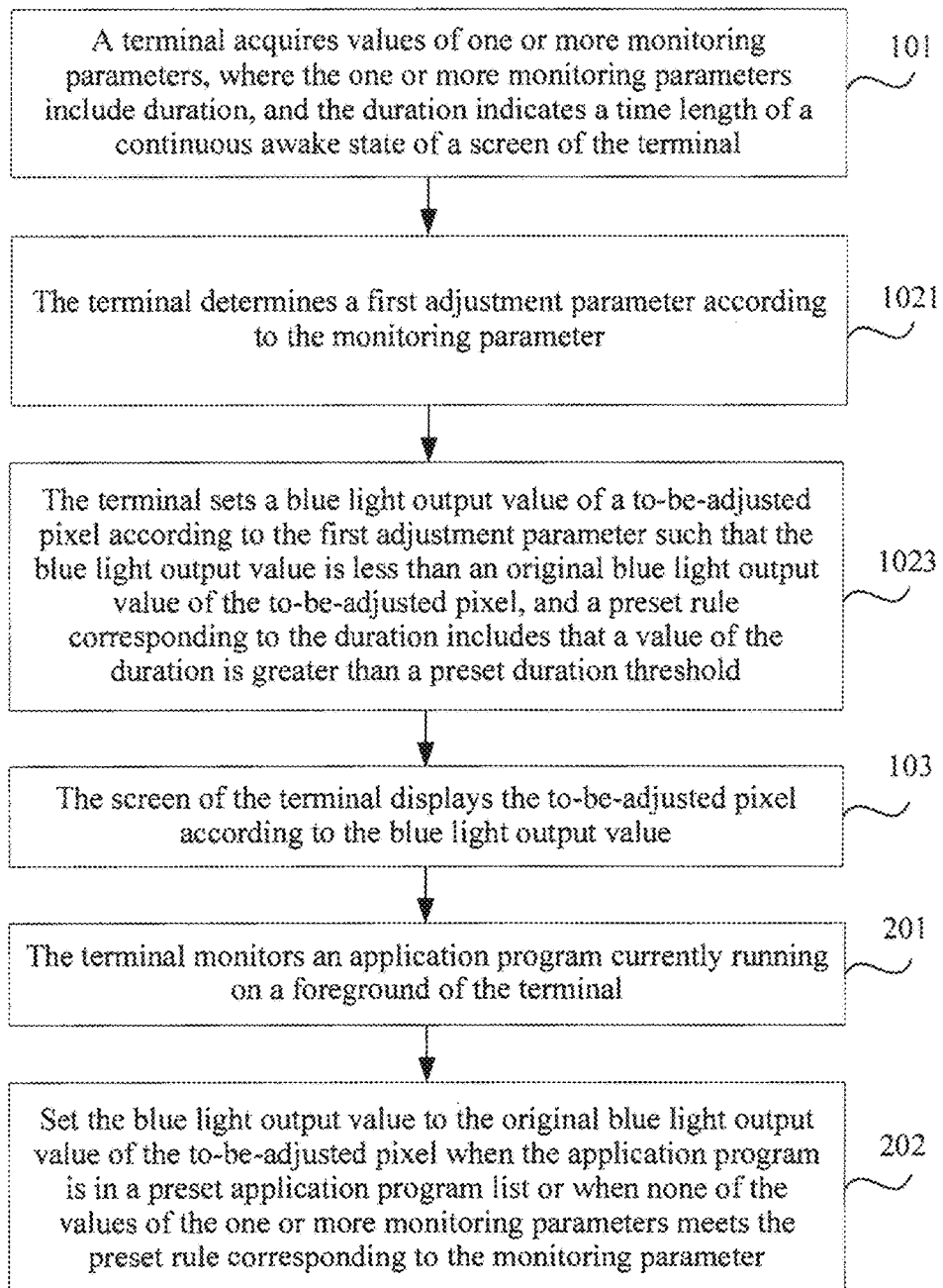
FIG. 3 is a flowchart of a blue light adjustment method according to still another embodiment of the present disclosure.

FIG. 3 is a flowchart of a blue light adjustment method according to another embodiment of the present disclosure. This embodiment of the present disclosure is implemented based on the embodiment shown in FIG. 2. As shown in FIG. 3, step 102 further includes the following steps.

Step 1021: The terminal determines a first adjustment parameter according to the monitoring parameter.

Step 1023: The terminal sets the blue light output value of the to-be-adjusted pixel according to the first adjustment parameter such that the blue light output value is less than the original blue light output value of the to-be-adjusted pixel, and a preset rule corresponding to the duration includes that a value of the duration is greater than a preset duration threshold.

It should be noted that the terminal may determine the first adjustment parameter according to one or more monitoring parameters, that is, the terminal may determine the first adjustment parameter according to one monitoring parameter or may determine the first adjustment parameter according to multiple monitoring parameters. A specific quantity of monitoring parameters used as a basis for determining the first adjustment parameter may be set according to an actual requirement, and this embodiment of the present disclosure does not impose a specific limitation. The following describes how to determine the first adjustment parameter using duration as an example.

For ease of description, A is used to represent the first adjustment parameter, and a value range of A is 0<A<1. Pin(x) represents the original blue light output value of the to-be-adjusted pixel, and Pout(x) represents the blue light output value of the to-be-adjusted pixel.

Optionally, Table 1 lists a correspondence between the duration and A. The correspondence is merely an example. In an actual product design process, another correspondence may be set according to an actual requirement.

TABLE 1

| Duration (min) | A |
|---|---|
| ≤10 | 0.9 |
| 10-20 | 0.8 |
| 20-30 | 0.7 |
| 30-40 | 0.6 |
| 40-50 | 0.5 |
| 50-60 | 0.4 |
| 60-70 | 0.3 |
| 70-80 | 0.2 |
| ≥80 | 0.1 |

In this case, the terminal may set the blue light output value of the to-be-adjusted pixel using a formula 1, that is, Pout(x)=A*Pin(x) such that the blue light output value is less than the original blue light output value of the to-be-adjusted pixel. It should be noted that the formula 1 is merely an example. In an actual product design process, a formula 1 in another form may be set according to an actual requirement, provided that the formula 1 can enable the blue light output value to be less than the original blue light output value of the to-be-adjusted pixel.

According to the blue light adjustment method provided in this embodiment of the present disclosure, the terminal determines the first adjustment parameter according to the monitoring parameter, and then the terminal sets the blue light output value of the to-be-adjusted pixel according to the first adjustment parameter such that the blue light output value is less than the original blue light output value of the to-be-adjusted pixel. Therefore, the terminal can intelligently perform blue light adjustment on the screen of the terminal according to the monitoring parameter, and an objective of vision protection without affecting user experience is achieved.

Figure 4:
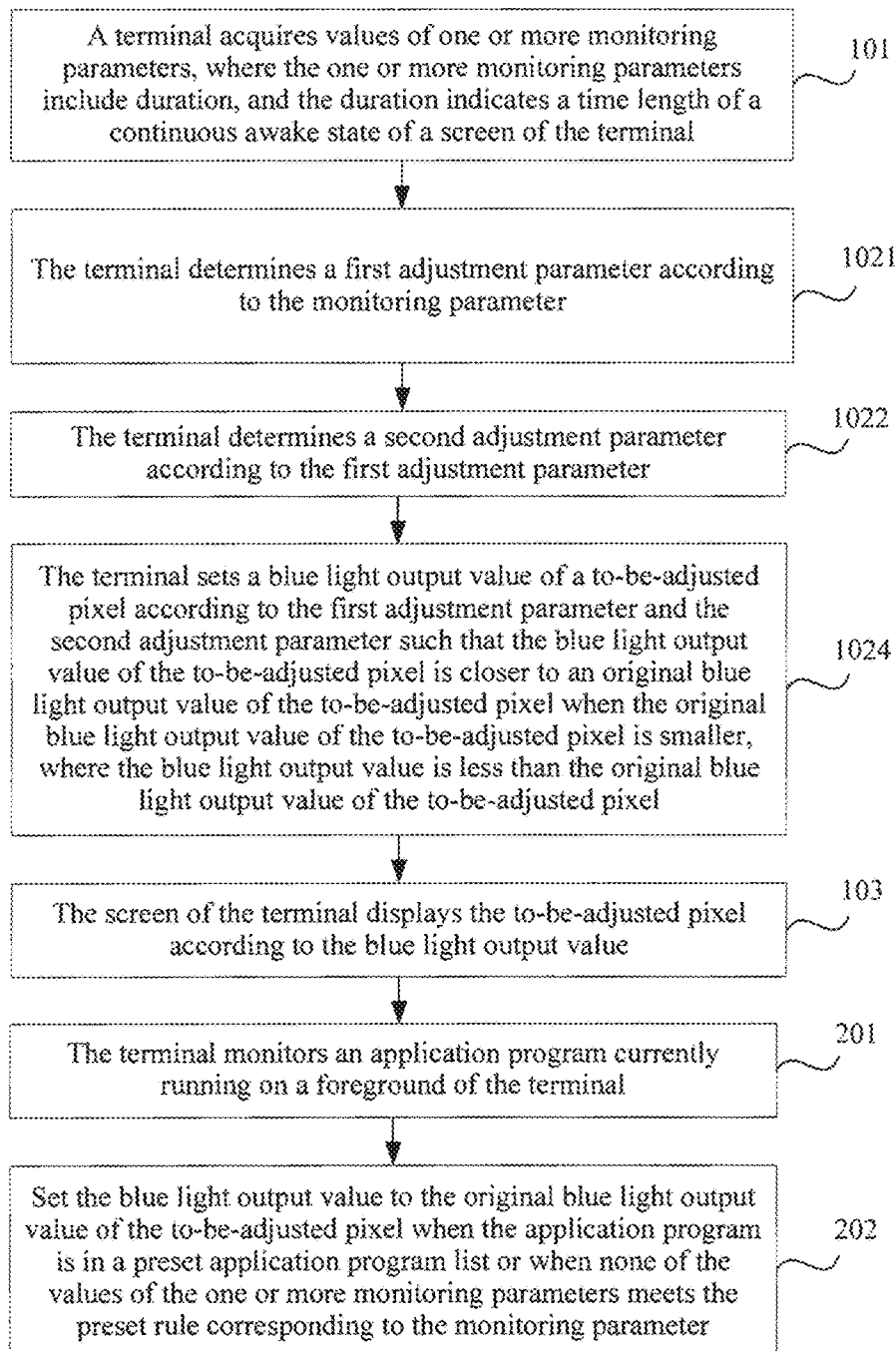
FIG. 4 is a flowchart of a blue light adjustment method according to yet another embodiment of the present disclosure.

FIG. 4 is a flowchart of a blue light adjustment method according to another embodiment of the present disclosure. This embodiment of the present disclosure is implemented based on the embodiments shown in FIG. 1, FIG. 2, and FIG. 3. As shown in FIG. 4, a flowchart implemented based on the embodiment in FIG. 3 is provided. After step 1021, the method further includes the following step.

Step 1022: The terminal determines a second adjustment parameter according to the first adjustment parameter.

Correspondingly, step 1023 is replaced with step 1024. Step 1024 includes that the terminal sets the blue light output value of the to-be-adjusted pixel according to the first adjustment parameter and the second adjustment parameter such that the blue light output value of the to-be-adjusted pixel is closer to the original blue light output value of the to-be-adjusted pixel when the original blue light output value of the to-be-adjusted pixel is smaller, where the blue light output value is less than the original blue light output value of the to-be-adjusted pixel.

For ease of description, G is used to represent the second adjustment parameter, and a value range of G is 1<G<10.

Optionally, Table 2 lists a correspondence between G and A. The correspondence is merely an example. In an actual product design process, another correspondence may be set according to an actual requirement.

TABLE 2

| Duration (min) | A | G |
|---|---|---|
| ≤10 | 0.9 | 10 |
| 10-20 | 0.8 | 10 |
| 20-30 | 0.7 | 4.2 |
| 30-40 | 0.6 | 3.5 |
| 40-50 | 0.5 | 2.5 |
| 50-60 | 0.4 | 2.0 |
| 60-70 | 0.3 | 1.8 |
| 70-80 | 0.2 | 1.6 |
| ≥80 | 0.1 | 1.1 |

In this case, the terminal may set the blue light output value of the to-be-adjusted pixel using a formula 2, that is, $Pout(x)=A*Pin(x)+A*Pin(x)*(1-Pin(x))^{1/G}$ such that the blue light output value is less than the original blue light output value of the to-be-adjusted pixel and in addition, the blue light output value of the to-be-adjusted pixel is closer to the original blue light output value of the to-be-adjusted pixel when the original blue light output value of the to-be-adjusted pixel is smaller. It should be noted that the formula 2 is merely an example, for example, a formula in a form of an ellipse, an exponent, or a hyperbola may also be used. In an actual product design process, a formula in another form may be set according to an actual requirement, provided that the formula 2 can enable the blue light output value to be less than the original blue light output value of the to-be-adjusted pixel and in addition, the blue light output value of the to-be-adjusted pixel is closer to the original blue light output value of the to-be-adjusted pixel when the original blue light output value of the to-be-adjusted pixel is smaller. Because the screen of the terminal is less harmful to the eye of the user when the original blue light output value of the to-be-adjusted pixel is smaller, in this case, the blue light output value of the to-be-adjusted pixel does not need to be adjusted too much, but a display effect of the to-be-adjusted pixel needs to be ensured.

Figure 5:
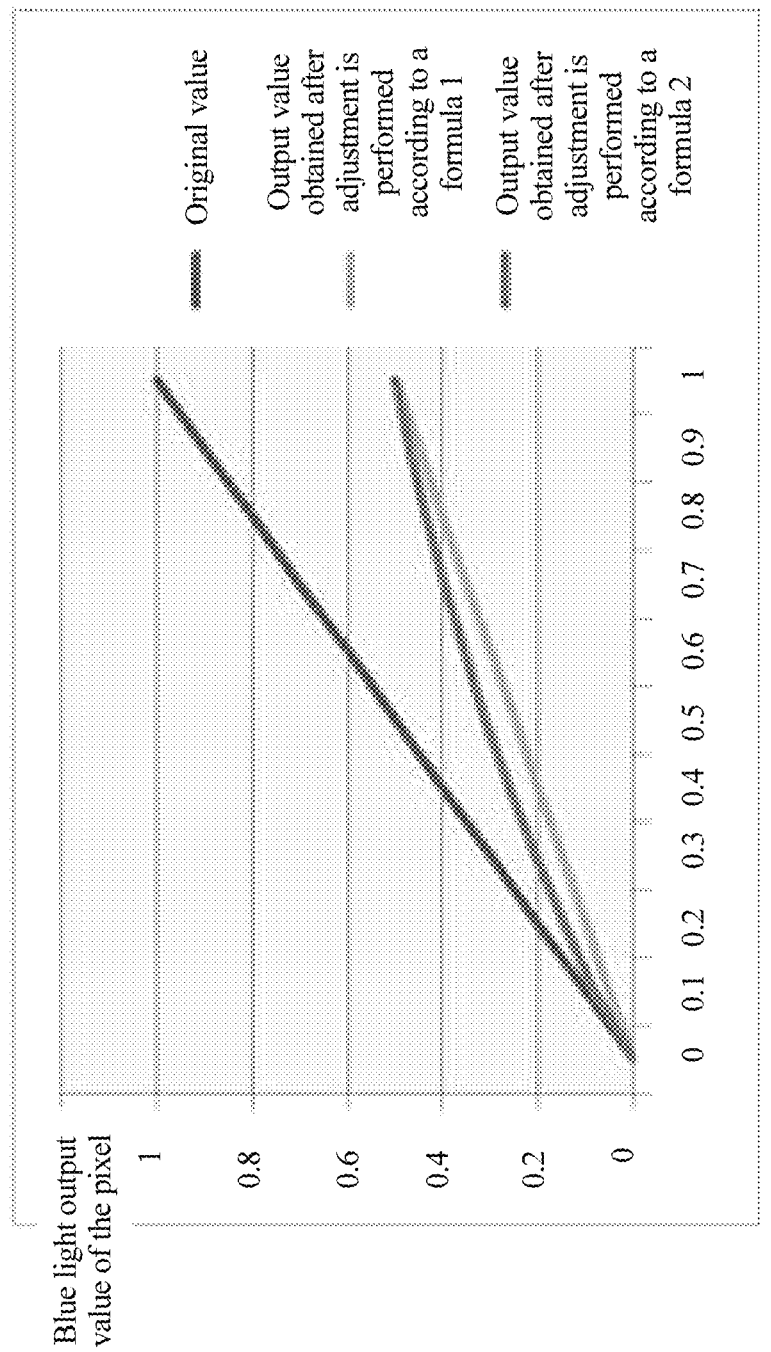
FIG. 5 is a schematic diagram of three types of blue light output values of a pixel when a first adjustment parameter is 0.7 and a second adjustment parameter is 4.2.

Referring to FIG. 5, FIG. 5 is a schematic diagram of three types of blue light output values of a pixel when A=0.7 and G=4.2. The three types of output values are an original blue light output value of the pixel, a blue light output value obtained after adjustment is performed according to a formula 1, and a blue light output value obtained after adjustment is performed according to a formula 2. FIG. 5 can visually depict a display effect of a to-be-adjusted pixel on a screen of a terminal after the terminal performs adjustment according to the first adjustment parameter and the second adjustment parameter, that is, the terminal may enable a blue light output value to be closer to an original blue light output value of the pixel when the screen of the terminal is in low light such that a display effect of the pixel is first ensured when less harm is caused to vision, and a user's user experience with the terminal is effectively improved.

According to the blue light adjustment method provided in this embodiment of the present disclosure, the terminal determines the first adjustment parameter according to the monitoring parameter, and then the terminal determines the second adjustment parameter according to the first adjustment parameter, and finally the terminal sets the blue light output value of the to-be-adjusted pixel according to the first adjustment parameter and the second adjustment parameter such that the blue light output value of the to-be-adjusted pixel is closer to the original blue light output value of the to-be-adjusted pixel when the original blue light output value of the to-be-adjusted pixel is smaller, a display effect of the pixel is first ensured when less harm is caused to vision, and a user's user experience with the terminal is effectively improved.

Figure 6:
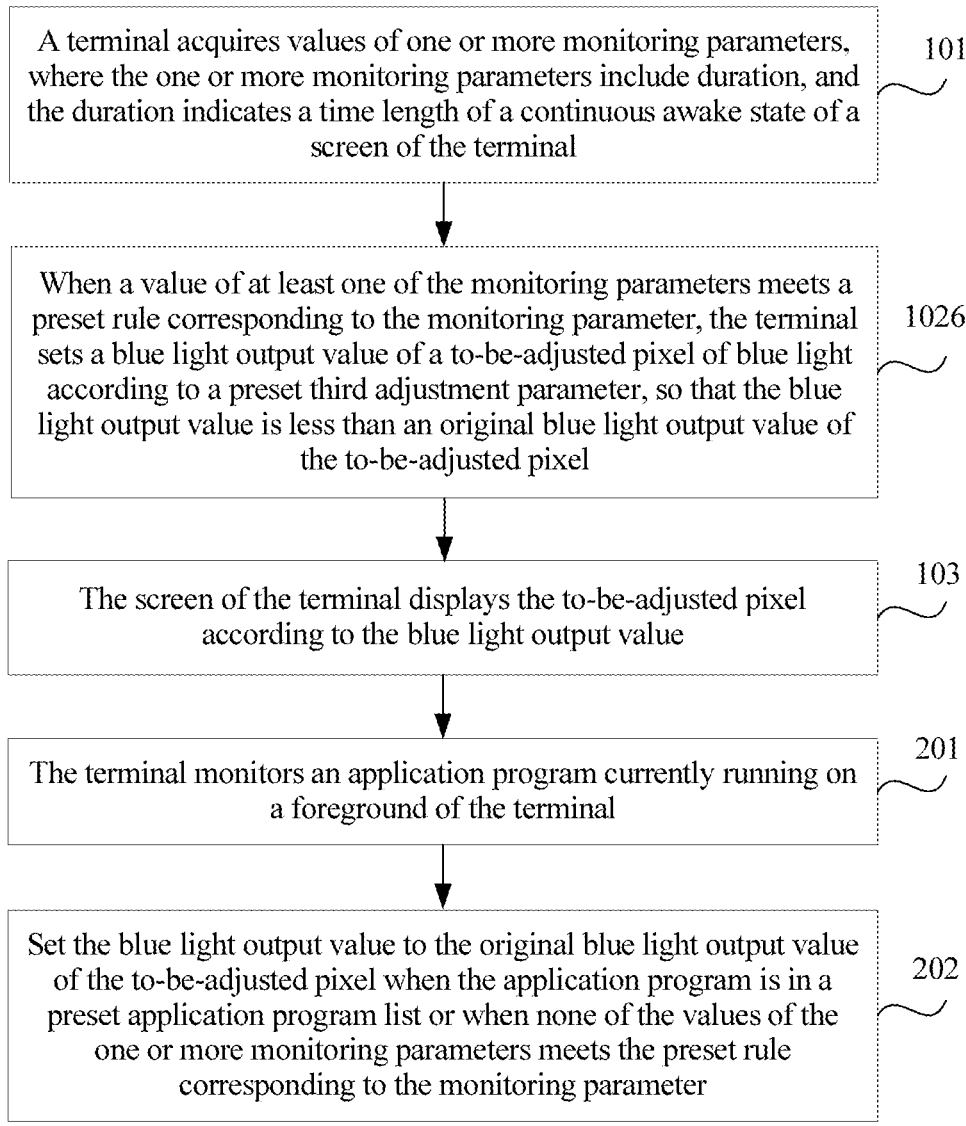
FIG. 6 is a flowchart of a drawing control method according to yet another embodiment of the present disclosure.

FIG. 6 is a flowchart of a blue light adjustment method according to yet another embodiment of the present disclosure. This embodiment of the present disclosure is implemented based on the embodiments shown in FIG. 1 and FIG. 2. As shown in FIG. 6, a flowchart implemented based on the embodiment in FIG. 2 is provided. Step 102 is replaced with step 1026, and step 1026 includes that when a value of at least one of the monitoring parameters meets a preset rule corresponding to the monitoring parameter, the terminal sets the blue light output value of the to-be-adjusted pixel according to a preset third adjustment parameter, so that the blue light output value is less than the original blue light output value of the to-be-adjusted pixel.

For example, when identifying, as a to-be-adjusted pixel, a pixel in a text (a black text on a white background, or a white text on a black background) area displayed on the screen of the terminal, the terminal may directly set a blue light output value of the to-be-adjusted pixel to a fixed value, for example, set the blue light output value of the to-be-adjusted pixel to 128.

According to the blue light adjustment method provided in this embodiment of the present disclosure, after identifying the to-be-adjusted pixel, the terminal directly sets the blue light output value of the to-be-adjusted pixel using the preset third adjustment parameter. Therefore a calculation step is not required, blue light adjustment of the to-be-adjusted pixel can be quickly completed, and an objective of vision protection without affecting user experience is achieved.

Figure 7A:
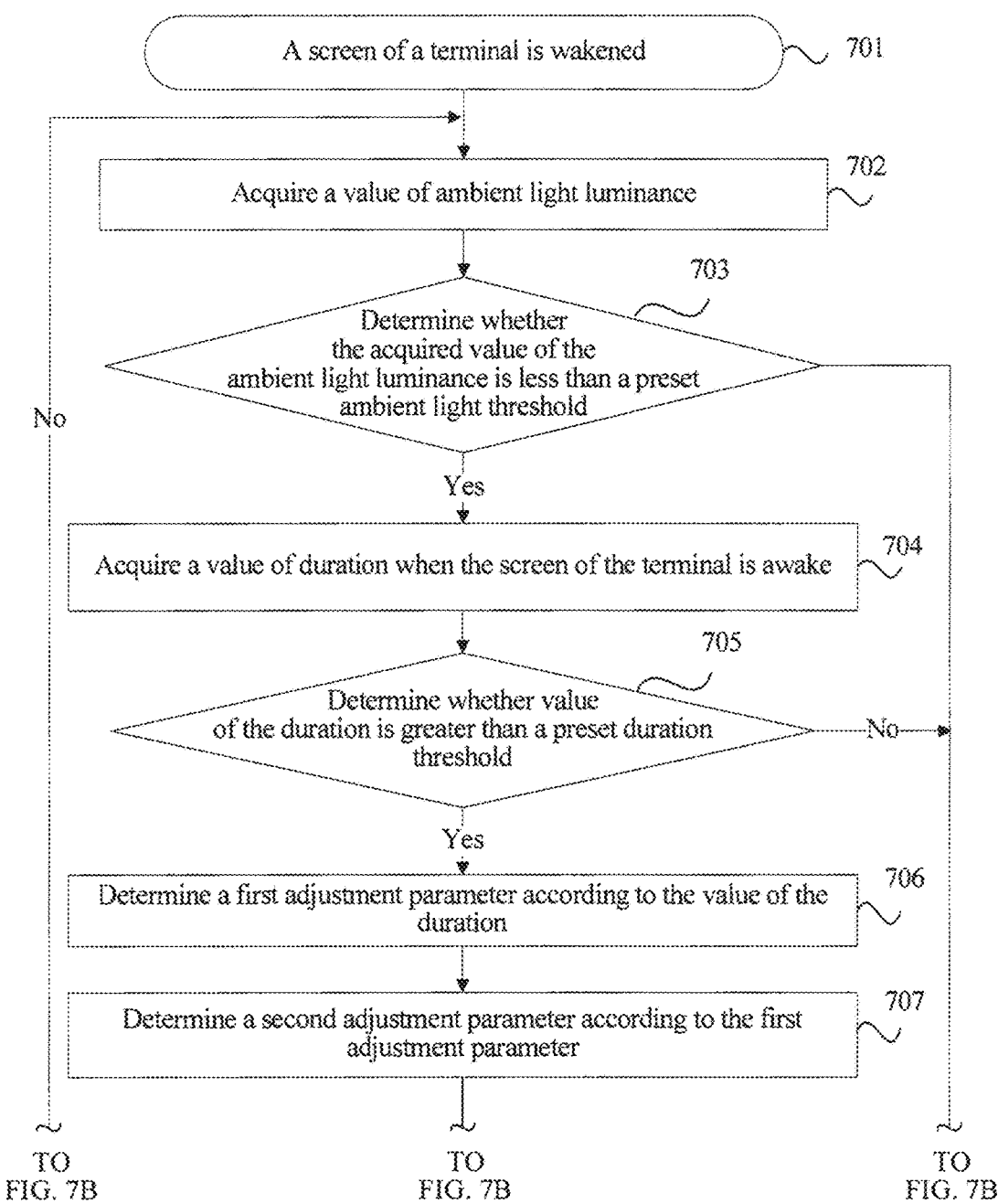
FIG. 7A and FIG. 7B are a detailed flowchart of a blue light adjustment method according to an embodiment of the present disclosure.
Figure 7B:
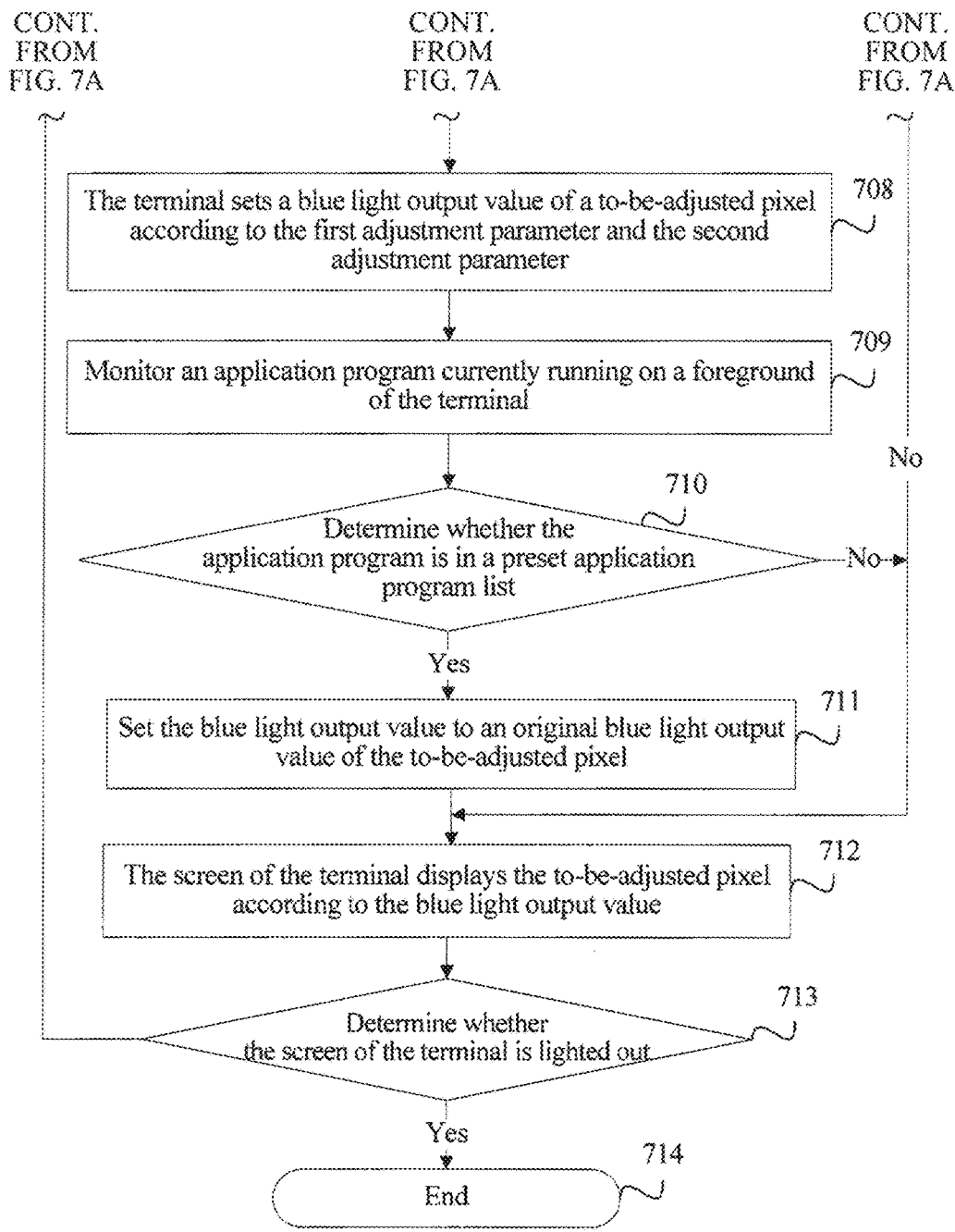

The following method shown in FIG. 7A and FIG. 7B uses the duration and the ambient light luminance as an example and provides a detailed flowchart of a blue light adjustment method according to an embodiment of the present disclosure.

Step 701: A screen of a terminal is wakened.

Step 702: The terminal acquires a value of ambient light luminance.

Step 703: Determine whether the acquired value of the ambient light luminance is less than a preset ambient light threshold, and if a result of the determining is yes, perform step 704, or if a result of the determining is no, skip subsequent adjustment steps and directly perform step 712, in which the screen of the terminal displays the to-be-adjusted pixel according to the blue light output value.

Step 704: Acquire a value of duration when the screen of the terminal is awake.

Step 705: Determine whether the acquired value of the duration is greater than a preset duration threshold, if a result of the determining is yes, perform step 706, or if a result of the determining is no, skip subsequent adjustment steps and directly perform step 712, in which the screen of the terminal displays the to-be-adjusted pixel according to the blue light output value.

Step 706: Determine a first adjustment parameter according to the value of the duration.

Step 707: Determine a second adjustment parameter according to the first adjustment parameter.

Step 708: The terminal sets the blue light output value of the to-be-adjusted pixel according to the first adjustment parameter and the second adjustment parameter.

Step 709: Monitor an application program currently running on a foreground of the terminal.

Step 710: Determine whether the application program is in a preset application program list, if a result of the determining is yes, perform step 711, or if a result of the determining is no, perform step 712.

Step 711: Set the blue light output value to an original blue light output value of the to-be-adjusted pixel.

Step 712: The screen of the terminal displays the to-be-adjusted pixel according to the blue light output value.

It should be noted that the blue light output value herein may be the original blue light output value, or may be an adjusted blue light output value. If step 711 is performed in this method, the blue light output value herein is the adjusted blue light output value, or if step 711 is not performed in this method, the blue light output value herein is the original blue light output value.

Step 713: Determine whether the screen of the terminal is lighted out, if a result of the determining is yes, perform step 714, or if a result of the determining is no, perform step 702.

Step 714: End.

It should be noted that a detailed procedure shown in FIG. 7A and FIG. 7B is merely an example, and in specific implementation, some steps may be added or omitted according to an actual requirement, or a sequence for executing the steps may be changed, and this embodiment of the present disclosure does not impose a specific limitation.

Figure 8:
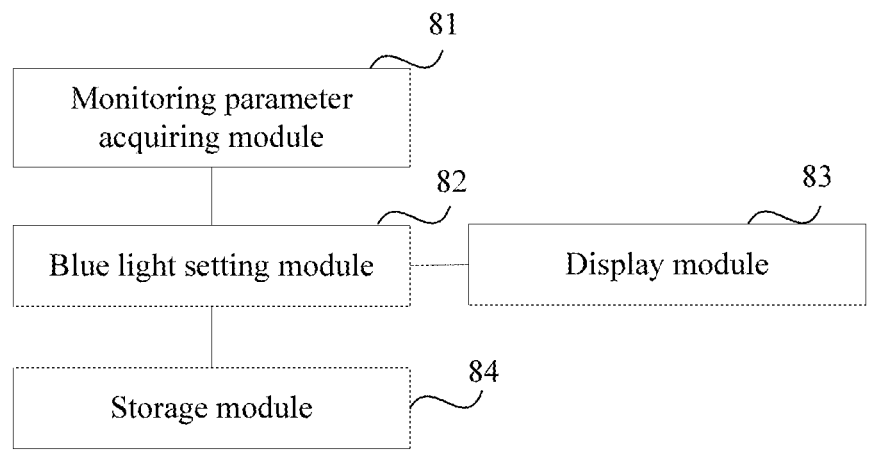
FIG. 8 is a schematic structural diagram of a blue light adjustment apparatus according to an embodiment of the present disclosure.

FIG. 8 is a schematic structural diagram of a blue light adjustment apparatus according to an embodiment of the present disclosure. As shown in FIG. 8, the blue light adjustment apparatus includes a monitoring parameter acquiring module 81, a blue light setting module 82, a display module 83, and a storage module 84.

The monitoring parameter acquiring module 81 is configured to acquire values of one or more monitoring parameters.

Optionally, the one or more monitoring parameters include duration, and the duration indicates a time length of a continuous awake state of the display module 83. The continuous awake state refers to that the display module 83 is in a continuous lighted-up state, that is, the display module 83 is not lighted out during a period in which the display module 83 is in a lighted-up state. In specific implementation, a timer may be provided on the apparatus. The timer starts timing when the display module 83 is wakened, and the timer stops timing when the display module 83 is lighted out. A duration value obtained by the timer by performing timing in a period from starting timing to stopping timing is set as a value of the duration. After the display module 83 is lighted out, the duration value is cleared, and when the display module 83 is wakened again, the timer re-calculates a time length of continuous operation of the display module 83, or may calculate a value of the duration in another manner. This embodiment of the present disclosure does not impose a specific limitation.

Optionally, the one or more monitoring parameters include one or a combination of more than one of the following parameters, such as ambient light luminance, a distance between an eye of a user and the display module 83, system time of the apparatus, a quantity of times the eye of the user closes per unit time, a motion status of the apparatus, or an original blue light output value of a to-be-adjusted pixel displayed on the display module 83.

For example, the one or more monitoring parameters may include the duration, or the ambient light luminance, or the distance between the eye of the user and the display module 83, or the system time of the apparatus, or the quantity of times the eye of the user closes per unit time, or the motion status of the apparatus, or the original blue light output value of the to-be-adjusted pixel displayed on the display module 83, or the one or more monitoring parameters may include the duration and the ambient light luminance, or the one or more monitoring parameters may include the duration and the distance between the eye of the user and the display module 83, or the one or more monitoring parameters may include the duration and the system time of the apparatus, or the one or more monitoring parameters may include the duration and the quantity of times the eye of the user closes per unit time, or the one or more monitoring parameters may include the duration and the motion status of the apparatus, or the one or more monitoring parameters may include the duration and the original blue light output value of the to-be-adjusted pixel displayed on the display module 83. No more examples are provided herein.

The blue light setting module 82 is configured for the apparatus to set, when a value, of at least one of the monitoring parameters, acquired by the monitoring parameter acquiring module 81 meets a preset rule that corresponds to the monitoring parameter and stored in the storage module 84, a blue light output value of the to-be-adjusted pixel according to the monitoring parameter, where the blue light output value is less than the original blue light output value of the to-be-adjusted pixel.

Optionally, when the one or more monitoring parameters include the duration, a preset rule corresponding to the duration includes that a value of the duration is greater than a preset duration threshold. The preset duration threshold is a duration value preset on the apparatus, and the preset duration threshold may be set to a preferred duration value obtained by performing an experimental test, or an interface for editing the preset duration threshold may be provided on the apparatus such that the user can set or modify the preset duration threshold on the editing interface. A specific implementation manner to be used may be defined according to an actual requirement, and this embodiment of the present disclosure does not impose a specific limitation.

Optionally, when the one or more monitoring parameters include the ambient light luminance, a preset rule corresponding to the ambient light luminance includes that an acquired value of the ambient light luminance is less than a preset ambient light threshold. The preset ambient light threshold is an ambient light luminance value preset on the apparatus, and the preset ambient light threshold may be set to a preferred ambient light luminance value obtained by performing an experimental test, or an interface for editing the preset ambient light threshold may be provided on the apparatus such that the user can set or modify the preset ambient light threshold on the editing interface. A specific implementation manner to be used may be further defined according to an actual requirement, and this embodiment of the present disclosure does not impose a specific limitation.

Optionally, when the one or more monitoring parameters include the distance between the eye of the user and the display module 83, a preset rule corresponding to the distance between the eye of the user and the display module 83 includes that an acquired value of the distance between the eye of the user and the display module 83 is less than a preset distance threshold. The preset distance threshold is a distance value preset on the apparatus, and the preset distance threshold may be set to a preferred distance value obtained by performing an experimental test, or an interface for editing the preset distance threshold may be provided on the apparatus such that the user can set or modify the preset distance threshold on the editing interface. A specific implementation manner to be used may be defined according to an actual requirement, and this embodiment of the present disclosure does not impose a specific limitation.

Optionally, when the one or more monitoring parameters include the system time, a preset rule corresponding to the system time includes that the acquired system time is within the preset time period. The preset time period includes a time period preset by the user or a sunset time period acquired by the apparatus from a network. That is, the preset time period may be the time period preset by the user on the apparatus, and the preset time period may be set to a preferred time period obtained by performing an experimental test, or an interface for editing the preset time period may be provided on the terminal such that the user can set or modify the preset time period on the editing interface, or the preset time period may be the sunset time period acquired by the apparatus from the network, and the apparatus periodically connects to the network to acquire an updated sunset time period. A specific implementation manner to be used may be defined according to an actual requirement, and this embodiment of the present disclosure does not impose a specific limitation.

Optionally, when the one or more monitoring parameters include the quantity of times the eye of the user closes per unit time, a preset rule corresponding to the quantity of times the eye of the user closes per unit time includes that an acquired value of the quantity of times the eye of the user closes per unit time is greater than a preset threshold of eye closing times. The preset threshold of eye closing times is a value of eye closing times preset on the apparatus, and the preset threshold of eye closing times may be set to a preferred value of eye closing times obtained by performing an experimental test, or an interface for editing the preset threshold of eye closing times may be provided on the apparatus such that the user can set or modify the preset threshold of eye closing times on the editing interface. A specific implementation manner to be used may be defined according to an actual requirement, and this embodiment of the present disclosure does not impose a specific limitation.

Optionally, when the one or more monitoring parameters include the motion status of the apparatus, a preset rule corresponding to the motion status of the apparatus includes that an acquired motion status of the apparatus is a moving state. The apparatus may monitor the motion status of the apparatus using a sensor.

Optionally, when the one or more monitoring parameters include the original blue light output value of the to-be-adjusted pixel displayed on the display module 83, a preset rule corresponding to the original blue light output value includes that the acquired original blue light output value is greater than a preset blue light threshold. The preset blue light threshold is a blue light value preset on the apparatus, and the preset blue light threshold may be set to a preferred blue light value obtained by performing an experimental test, or an interface for editing the preset blue light threshold may be provided on the apparatus such that the user can set or modify the preset blue light threshold on the editing interface. A specific implementation manner to be used may be defined according to an actual requirement, and this embodiment of the present disclosure does not impose a specific limitation.

It should be noted that, when the one or more monitoring parameters include two or more monitoring parameters, after acquiring values of the two or more monitoring parameters, the apparatus needs to determine whether the values of the two or more monitoring parameters meet preset rules corresponding to the monitoring parameters, and when one of the monitoring parameters meets a preset rule corresponding to the monitoring parameter (it is not required that the values of all the monitoring parameters meet the preset rules corresponding to the monitoring parameters), the apparatus sets a blue light output value of a to-be-adjusted pixel according to the monitoring parameter. There may be multiple specific implementation manners. For example, the apparatus may first acquire the values of all the monitoring parameters, and then compare the acquired values with the preset rules one by one, that is, first acquire the values of all the monitoring parameters, and then perform a comparison operation between an acquired value of a monitoring parameter and a preset rule, and provided that one of the monitoring parameters meets a preset rule corresponding to the monitoring parameter, the apparatus sets a blue light output value of a to-be-adjusted pixel according to the monitoring parameter, or the terminal may perform a comparison operation after acquiring a value of one monitoring parameter, that is, acquire the values of the monitoring parameters according to a priority order, and after acquiring a value of one monitoring parameter, perform a comparison operation between the acquired value of the monitoring parameter and a preset rule, and when the acquired value of the monitoring parameter meets the preset rule, stop acquiring and performing a comparison operation on a value of a remaining monitoring parameter, and the apparatus sets a blue light output value of a to-be-adjusted pixel according to the monitoring parameter, and in this way, the blue light output value of the to-be-adjusted pixel is set provided that a value of one monitoring parameter meets a preset rule, without a need to acquire all the monitoring parameters, and also without a need to complete comparison operations between all the monitoring parameters and the preset rules, and therefore the apparatus can quickly adjust blue light of a to-be-adjusted pixel, which effectively reduces resource consumption of the apparatus.

The display module 83 is configured to display the to-be-adjusted pixel according to the blue light output value set by the blue light setting module 82.

It should be noted that when the display module 83 displays a pixel, not only blue light is included, but also light in another color is included. The light in another color is irrelevant to this embodiment of the present disclosure, and therefore only blue light is mentioned when a specific solution is described and description of the light in another color is ignored.

Optionally, the to-be-adjusted pixel displayed on the display module 83 further includes all pixels displayed on the display module 83, or some pixels displayed on the display module 83.

The apparatus may adjust all pixels displayed on the display module 83, or may identify some to-be-adjusted pixels displayed on the display module 83, adjust the to-be-adjusted pixels, and display another pixel according to an original value. A specific implementation manner to be used may be defined according to an actual requirement, and this embodiment of the present disclosure does not impose a specific limitation. For example, the apparatus identifies, as a to-be-adjusted pixel, a pixel in a text (a black text on a white background, or a white text on a black background) area displayed on the display module 83.

The storage module 84 is configured to store the preset rule corresponding to the monitoring parameter.

According to the blue light adjustment apparatus provided in this embodiment of the present disclosure, the apparatus acquires the values of the one or more monitoring parameters, the apparatus sets, according to the monitoring parameter, the blue light output value of the to-be-adjusted pixel displayed on the display module when a value of at least one of the monitoring parameters meets a preset rule corresponding to the monitoring parameter, where the blue light output value is less than the original blue light output value of the to-be-adjusted pixel. The display module displays the to-be-adjusted pixel according to the blue light output value such that the apparatus can determine, according to the value of the monitoring parameter, whether to adjust blue light of the display module, and set, according to the monitoring parameter, the blue light output value of the to-be-adjusted pixel displayed on the display module, and therefore the blue light can be adjusted intelligently, and an objective of vision protection without affecting user experience is achieved.

Figure 9:
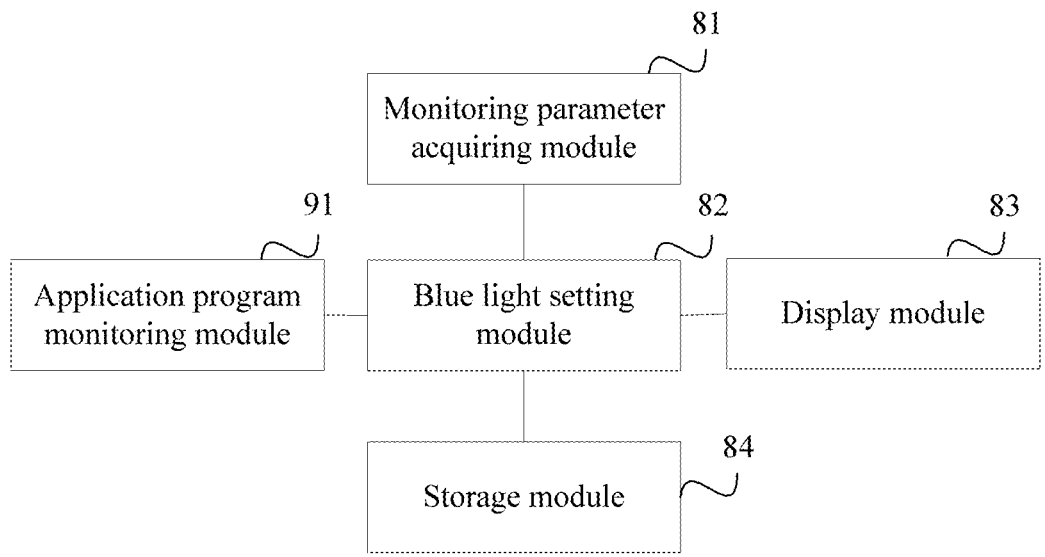
FIG. 9 is a schematic structural diagram of a blue light adjustment apparatus according to another embodiment of the present disclosure.

FIG. 9 is a schematic structural diagram of a blue light adjustment apparatus according to another embodiment of the present disclosure. This embodiment of the present disclosure is implemented based on the embodiment shown in FIG. 8. As shown in FIG. 9, the apparatus further includes an application program monitoring module 91 configured to monitor an application program currently running on a foreground of the apparatus.

The storage module 84 is further configured to store a preset application program list.

The blue light setting module 82 is further configured to set the blue light output value to the original blue light output value of the to-be-adjusted pixel when the application program acquired by the application program monitoring module 91 is in the preset application program list stored in the storage module 84 or when none of the values, of the one or more monitoring parameters, acquired by the monitoring parameter acquiring module 81 meets the preset rule that corresponds to the monitoring parameter and that is stored in the storage module 84.

It should be noted that the preset application program list is stored in the storage module 84 of the apparatus, and an application program that has a relatively high pixel output quality requirement is stored in this preset application program list, for example, a video player or a photo player.

The blue light output value is set to the original blue light output value of the to-be-adjusted pixel, that is, adjustment on blue light of the to-be-adjusted pixel is stopped when the application program is in the preset application program list stored in the storage module 84.

When none of the values of the monitoring parameters meets the preset rule that corresponds to the monitoring parameter and that is stored in the storage module 84, the blue light output value is set to the original blue light output value of the to-be-adjusted pixel, that is, adjustment on blue light of the to-be-adjusted pixel is stopped.

According to the blue light adjustment apparatus provided in this embodiment of the present disclosure, a condition for stopping blue light adjustment is set, and the apparatus automatically determines whether blue light adjustment needs to be stopped such that the apparatus can intelligently stop blue light adjustment when blue light adjustment is unsuitable or blue light adjustment is not required, and an objective of vision protection without affecting user experience is achieved.

Figure 10:
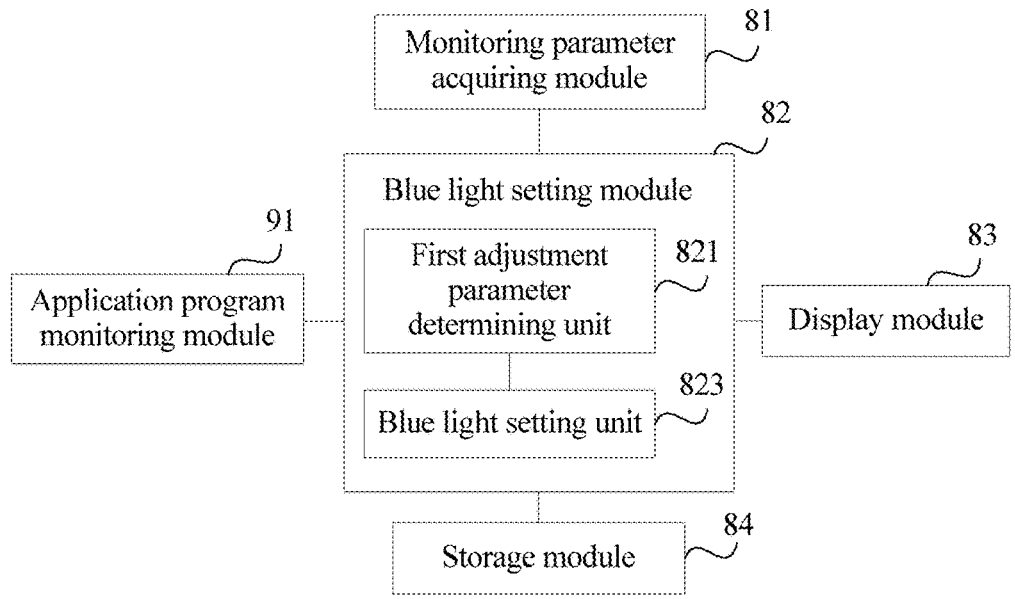
FIG. 10 is a schematic structural diagram of a blue light adjustment apparatus according to still another embodiment of the present disclosure.

FIG. 10 is a schematic structural diagram of a blue light adjustment apparatus according to another embodiment of the present disclosure. This embodiment of the present disclosure is implemented based on the embodiment shown in FIG. 9. As shown in FIG. 10, the blue light setting module includes a first adjustment parameter determining unit 821 configured to determine a first adjustment parameter according to the monitoring parameter acquired by the monitoring parameter acquiring module 81, and a blue light setting unit 823 configured to set the blue light output value of the to-be-adjusted pixel according to the first adjustment parameter determined by the first adjustment parameter determining unit 821 such that the blue light output value is less than the original blue light output value of the to-be-adjusted pixel.

It should be noted that the apparatus may determine the first adjustment parameter according to one or more monitoring parameters, that is, the apparatus may determine the first adjustment parameter according to one monitoring parameter or may determine the first adjustment parameter according to multiple monitoring parameters. A specific quantity of monitoring parameters used as a basis for determining the first adjustment parameter may be set according to an actual requirement, and this embodiment of the present disclosure does not impose a specific limitation. Duration is used as an example to describe a detailed procedure for setting the blue light output value of the to-be-adjusted pixel according to the first adjustment parameter. For details, reference may be made to the method embodiments, and details are not described herein.

According to the blue light adjustment apparatus provided in this embodiment of the present disclosure, the apparatus determines the first adjustment parameter according to the monitoring parameter and then the apparatus sets the blue light output value of the to-be-adjusted pixel according to the first adjustment parameter such that the blue light output value is less than the original blue light output value of the to-be-adjusted pixel. Therefore, the apparatus can intelligently perform blue light adjustment on the display module according to the monitoring parameter, and an objective of vision protection without affecting user experience is achieved.

Figure 11:
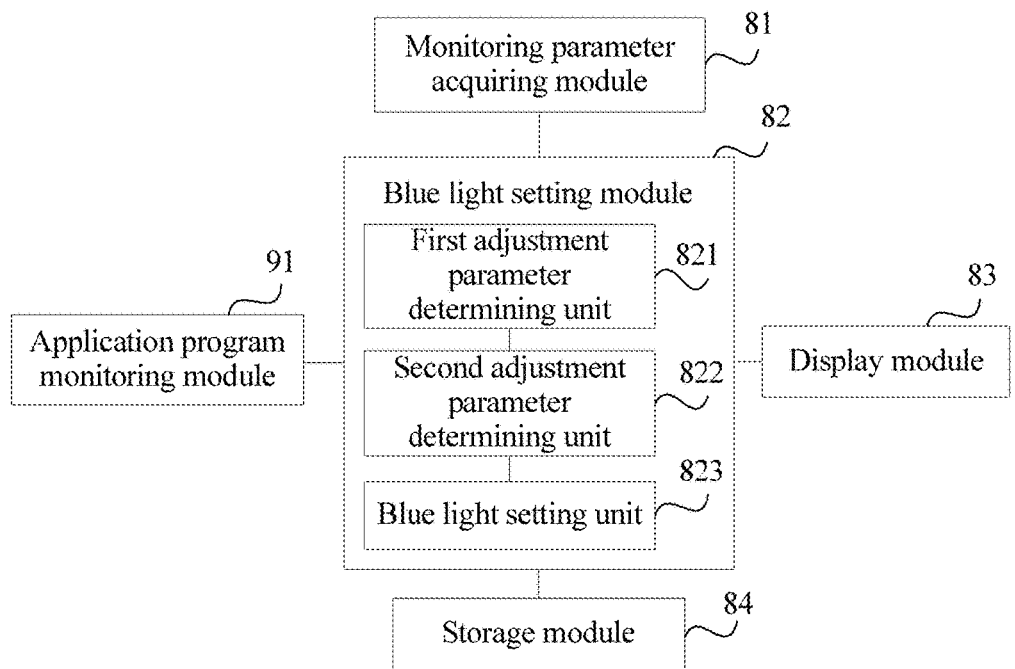
FIG. 11 is a schematic structural diagram of a blue light adjustment apparatus according to yet another embodiment of the present disclosure.

FIG. 11 is a schematic structural diagram of a blue light adjustment apparatus according to another embodiment of the present disclosure. This embodiment of the present disclosure is implemented based on the embodiments shown in FIG. 8, FIG. 9, and FIG. 10. As shown in FIG. 11, a flowchart implemented based on the embodiment in FIG. 10 is provided. The blue light setting module further includes a second adjustment parameter determining unit 822 configured to determine a second adjustment parameter according to the first adjustment parameter determined by the first adjustment parameter determining unit 821.

The blue light setting unit 823 is further configured to set the blue light output value of the to-be-adjusted pixel according to the first adjustment parameter determined by the first adjustment parameter determining unit 821 and the second adjustment parameter determined by the second adjustment parameter determining unit 822 such that the blue light output value of the to-be-adjusted pixel is closer to the original blue light output value of the to-be-adjusted pixel when the original blue light output value of the to-be-adjusted pixel is smaller. Duration is used as an example to describe a detailed procedure for setting the blue light output value of the to-be-adjusted pixel according to the first adjustment parameter and the second adjustment parameter. For details, reference may be made to the method embodiments, and details are not described herein.

According to the blue light adjustment apparatus provided in this embodiment of the present disclosure, the apparatus determines the first adjustment parameter according to the monitoring parameter, and then the apparatus determines the second adjustment parameter according to the first adjustment parameter, and finally the apparatus sets the blue light output value of the to-be-adjusted pixel according to the first adjustment parameter and the second adjustment parameter such that the blue light output value of the to-be-adjusted pixel is closer to the original blue light output value of the to-be-adjusted pixel when the original blue light output value of the to-be-adjusted pixel is smaller, and a display effect of the pixel is first ensured when less harm is caused to vision.

Referring to the schematic structural diagram of the blue light adjustment apparatus implemented in the embodiment of FIG. 8, the storage module 84 is further configured to store a preset third adjustment parameter, and the blue light setting module 82 is further configured to set the blue light output value of the to-be-adjusted pixel according to the preset third adjustment parameter stored in the storage module 84 such that the blue light output value is less than the original blue light output value of the to-be-adjusted pixel.

It should be noted that, when identifying, as a to-be-adjusted pixel, a pixel in a text (a black text on a white background, or a white text on a black background) area displayed on the display module 83, the apparatus may directly set a blue light output value of the to-be-adjusted pixel to a fixed value, for example, set the blue light output value of the to-be-adjusted pixel to 128.

According to the blue light adjustment apparatus provided in this embodiment of the present disclosure, after identifying the to-be-adjusted pixel, the apparatus directly sets the blue light output value of the to-be-adjusted pixel using the preset third adjustment parameter. Therefore a calculation step is not required, blue light adjustment of the to-be-adjusted pixel can be quickly completed, and an objective of vision protection without affecting user experience is achieved.

The apparatus provided in this embodiment of the present disclosure may be configured to perform the procedure of the blue light adjustment method shown in FIG. 7A and FIG. 7B, and details of a specific operation procedure of the apparatus are not described herein. For details, reference may be made to description of the method embodiment.

Figure 12:
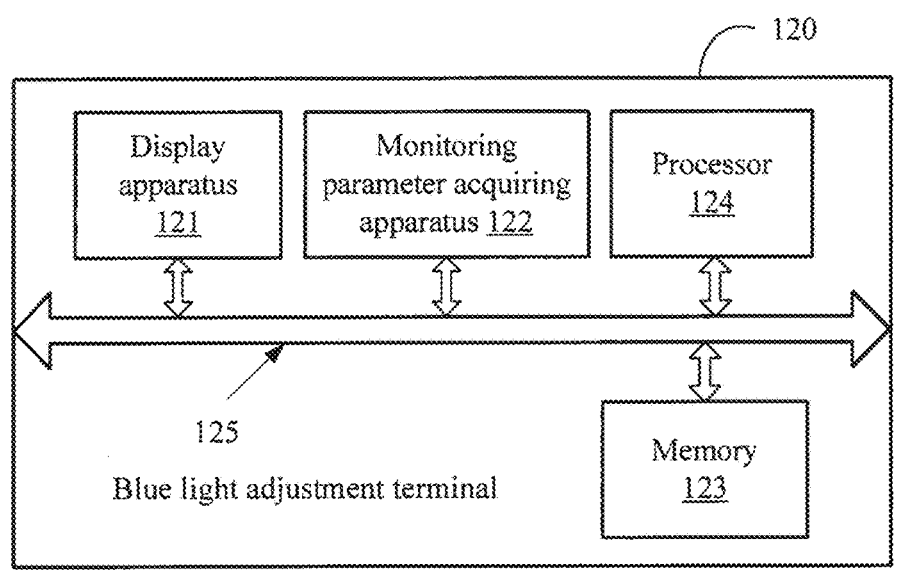
FIG. 12 is a schematic structural diagram of a blue light adjustment terminal according to an embodiment of the present disclosure.

FIG. 12 is a schematic structural diagram of a blue light adjustment terminal according to an embodiment of the present disclosure.

The blue light adjustment terminal provided in this embodiment of the present disclosure may be a fixed terminal, for example, a desktop computer or a television, or may be a mobile terminal, for example, a tablet computer or a mobile phone, or may even be a projector or a wearable device, for example, a GOOGLE GLASS.

The terminal 120 includes a display apparatus 121, a monitoring parameter acquiring apparatus 122, a memory 123, a processor 124, and a bus system 125.

The display apparatus 121 may be an appropriate apparatus such as a cathode ray tube (CRT) display screen, a liquid crystal display (LCD) screen, or a touch display screen, and receives an instruction using the bus system 125 in order to present a graphical user interface on a screen of the display screen.

The monitoring parameter acquiring apparatus 122 may include any apparatus that can acquire a monitoring parameter value, such as various sensors or cameras, and is configured to acquire a monitoring parameter value and send the acquired monitoring parameter value to the processor 124 or another component using the bus system 125.

In addition, the memory 123 may include a random access memory (RAM), a read-only memory (ROM), any fixed storage medium, or a mobile storage medium, and is configured to store a program that can execute this embodiment of the present disclosure or store data of this embodiment of the present disclosure.

The processor 124 is configured to execute the program for this embodiment of the present disclosure that is stored in the memory 123 and perform two-way communication with another apparatus using the bus system 125.

The memory 123 and the processor 124 may be integrated into a physical module in which this embodiment of the present disclosure is applied, where the program for implementing this embodiment of the present disclosure is stored and operates on the physical module.

All components of the terminal 120 are coupled together using the bus system 125, where the bus system 125 may include a power bus, a control bus, and a status signal bus in addition to a data bus. However, for clarity of description, all types of buses are marked as the bus system 125 in FIG. 12.

In this embodiment of the present disclosure, the monitoring parameter acquiring apparatus 122 is configured to acquire values of one or more monitoring parameters.

Optionally, the one or more monitoring parameters include duration, and the duration indicates a time length of a continuous awake state of the display apparatus 121. The continuous awake state refers to that the display apparatus 121 is in a continuous lighted-up state, that is, the display apparatus 121 is not lighted out during a period in which the display apparatus 121 is in a lighted-up state. In specific implementation, a timer may be provided on the apparatus. The timer starts timing when the display apparatus 121 is wakened, and the timer stops timing when the display apparatus 121 is lighted out. A duration value obtained by the timer by performing timing in a period from starting timing to stopping timing is set as a value of the duration. After the display apparatus 121 is lighted out, the duration value is cleared, and when the display apparatus 121 is wakened again, the timer re-calculates a time length of continuous operation of the display apparatus 121, or may calculate a value of the duration in another manner. This embodiment of the present disclosure does not impose a specific limitation.

Optionally, the one or more monitoring parameters include one or a combination of more than one of the following parameters, such as ambient light luminance, a distance between an eye of a user and the display apparatus 121, system time of the terminal 120, a quantity of times the eye of the user closes per unit time, a motion status of the terminal 120, or an original blue light output value of a to-be-adjusted pixel displayed on the display apparatus 121.

For example, the one or more monitoring parameters may include the duration, or the ambient light luminance, or the distance between the eye of the user and the display apparatus 121, or the system time of the terminal 120, or the quantity of times the eye of the user closes per unit time, or the motion status of the terminal 120, or the original blue light output value of the to-be-adjusted pixel displayed on the display apparatus 121, or the one or more monitoring parameters may include the duration and the ambient light luminance of the terminal 120, or the one or more monitoring parameters may include the duration and the distance between the eye of the user and the display apparatus 121, or the one or more monitoring parameters may include the duration and the system time of the terminal 120, or the one or more monitoring parameters may include the duration and the quantity of times the eye of the user closes per unit time, or the one or more monitoring parameters may include the duration and the motion status of the terminal 120, or the one or more monitoring parameters may include the duration and the original blue light output value of the to-be-adjusted pixel displayed on the display apparatus 121. No more examples are provided herein.

The processor 124 is configured to set, when a value, of at least one of the monitoring parameters, acquired by the monitoring parameter acquiring apparatus 122 meets a preset rule corresponding to the monitoring parameter, a blue light output value of the to-be-adjusted pixel according to the monitoring parameter, where the blue light output value is less than the original blue light output value of the to-be-adjusted pixel, and a preset rule corresponding to the duration includes that a value of the duration is greater than a preset duration threshold.

It should be noted that, if a screen of the terminal 120 uses hardware with adjustable backlight, blue light output of a to-be-adjusted pixel may be adjusted by adjusting a backlight source. In this way, adjustment may be performed on a light source that emits light, which may reduce power consumption of the terminal 120. Certainly, a filter of the terminal 120 may be enabled to adjust blue light output of a to-be-adjusted pixel, and this manner is more flexible, more careful, and easy to implement, and an adjustment result may be accurate to a specific pixel.

Optionally, the to-be-adjusted pixel displayed on the display apparatus 121 of the terminal 120 further includes all pixels displayed on the display apparatus 121 of the terminal 120, or some pixels displayed on the display apparatus 121 of the terminal 120.

The terminal 120 may adjust all pixels displayed on the display apparatus 121, or may identify some to-be-adjusted pixels displayed on the display apparatus 121, adjust the to-be-adjusted pixels, and display another pixel according to an original value. A specific implementation manner to be used may be defined according to an actual requirement, and this embodiment of the present disclosure does not impose a specific limitation. For example, the terminal 120 identifies, as a to-be-adjusted pixel, a pixel in a text (a black text on a white background, or a white text on a black background) area displayed on the screen of the terminal 120.

Optionally, when the one or more monitoring parameters include the duration, a preset rule corresponding to the duration includes that a value of the duration is greater than a preset duration threshold. The preset duration threshold is a duration value preset on the terminal 120, and the preset duration threshold may be set to a preferred duration value obtained by performing an experimental test and may be set before the terminal 120 is delivered, or an interface for editing the preset duration threshold may be provided on the terminal 120 such that the user can set or modify the preset duration threshold on the editing interface. A specific implementation manner to be used may be defined according to an actual requirement, and this embodiment of the present disclosure does not impose a specific limitation.

Optionally, when the one or more monitoring parameters include the ambient light luminance, a preset rule corresponding to the ambient light luminance includes that an acquired value of the ambient light luminance is less than a preset ambient light threshold. The preset ambient light threshold is an ambient light luminance value preset on the apparatus, and the preset ambient light threshold may be set to a preferred ambient light luminance value obtained by performing an experimental test and may be set before the terminal 120 is delivered, or an interface for editing the preset ambient light threshold may be provided on the terminal 120 such that the user can set or modify the preset ambient light threshold on the editing interface. A specific implementation manner to be used may be further defined according to an actual requirement, and this embodiment of the present disclosure does not impose a specific limitation.

Optionally, when the one or more monitoring parameters include the distance between the eye of the user and the display apparatus 121, a preset rule corresponding to the distance between the eye of the user and the display apparatus 121 includes that an acquired value of the distance between the eye of the user and the display apparatus 121 is less than a preset distance threshold. The preset distance threshold is a distance value preset on the terminal 120, and the preset distance threshold may be set to a preferred distance value obtained by performing an experimental test and may be set before the terminal 120 is delivered, or an interface for editing the preset distance threshold may be provided on the terminal 120 such that the user can set or modify the preset distance threshold on the editing interface. A specific implementation manner to be used may be defined according to an actual requirement, and this embodiment of the present disclosure does not impose a specific limitation.

Optionally, when the one or more monitoring parameters include the system time, a preset rule corresponding to the system time includes that the acquired system time is within the preset time period. The preset time period includes a time period preset by the user or a sunset time period acquired by the terminal 120 from a network. That is, the preset time period may be the time period preset by the user on the terminal 120, and the preset time period may be set to a preferred time period obtained by performing an experimental test and may be set before the terminal 120 is delivered, or an interface for editing the preset time period may be provided on the terminal 120 such that the user can set or modify the preset time period on the editing interface, or the preset time period may be the sunset time period acquired by the terminal 120 from the network, and the terminal 120 periodically connects to the network to acquire an updated sunset time period. A specific implementation manner to be used may be defined according to an actual requirement, and this embodiment of the present disclosure does not impose a specific limitation.

Optionally, when the one or more monitoring parameters include the quantity of times the eye of the user closes per unit time, a preset rule corresponding to the quantity of times the eye of the user closes per unit time includes that an acquired value of the quantity of times the eye of the user closes per unit time is greater than a preset threshold of eye closing times. The preset threshold of eye closing times is a value of eye closing times preset on the terminal 120, and the preset threshold of eye closing times may be set to a preferred value of eye closing times obtained by performing an experimental test and may be set before the terminal 120 is delivered, or an interface for editing the preset threshold of eye closing times may be provided on the terminal 120 such that the user can set or modify the preset threshold of eye closing times on the editing interface. A specific implementation manner to be used may be defined according to an actual requirement, and this embodiment of the present disclosure does not impose a specific limitation.

Optionally, when the one or more monitoring parameters include the motion status of the terminal 120, a preset rule corresponding to the motion status of the terminal 120 includes that an acquired motion status of the terminal 120 is a moving state. The terminal 120 may monitor the motion status of the terminal 120 using a sensor.

Optionally, when the one or more monitoring parameters include the original blue light output value of the to-be-adjusted pixel displayed on the display apparatus 121, a preset rule corresponding to the original blue light output value includes that the acquired original blue light output value is greater than a preset blue light threshold. The preset blue light threshold is a blue light value preset on the terminal 120, and the preset blue light threshold may be set to a preferred blue light value obtained by performing an experimental test and may be set before the terminal 120 is delivered, or an interface for editing the preset blue light threshold may be provided on the apparatus such that the user can set or modify the preset blue light threshold on the editing interface. A specific implementation manner to be used may be defined according to an actual requirement, and this embodiment of the present disclosure does not impose a specific limitation.

It should be noted that, when the one or more monitoring parameters include two or more monitoring parameters, after acquiring values of the two or more monitoring parameters, the terminal 120 needs to determine whether the values of the two or more monitoring parameters meet preset rules corresponding to the monitoring parameters, and when one of the monitoring parameters meets a preset rule corresponding to the monitoring parameter (it is not required that the values of all the monitoring parameters meet the preset rules corresponding to the monitoring parameters), the terminal 120 sets a blue light output value of a to-be-adjusted pixel according to the monitoring parameter. There may be multiple specific implementation manners. For example, the terminal 120 may first acquire the values of all the monitoring parameters, and then compare the acquired values with the preset rules one by one, that is, first acquire the values of all the monitoring parameters, and then perform a comparison operation between an acquired value of a monitoring parameter and a preset rule, and provided that one of the monitoring parameters meets a preset rule corresponding to the monitoring parameter, the apparatus sets a blue light output value of a to-be-adjusted pixel according to the monitoring parameter, or the terminal 120 may perform a comparison operation after acquiring a value of one monitoring parameter, that is, acquire the values of the monitoring parameters according to a priority order, and after acquiring a value of one monitoring parameter, perform a comparison operation between the acquired value of the monitoring parameter and a preset rule, and when the acquired value of the monitoring parameter meets the preset rule, stop acquiring and performing a comparison operation on a value of a remaining monitoring parameter, and the terminal 120 sets a blue light output value of a to-be-adjusted pixel according to the monitoring parameter, and in this way, the blue light output value of the to-be-adjusted pixel is set provided that a value of one monitoring parameter meets a preset rule, without a need to acquire all the monitoring parameters, and also without a need to complete comparison operations between all the monitoring parameters and the preset rules, and therefore the terminal 120 can quickly adjust blue light of a to-be-adjusted pixel, which effectively reduces resource consumption of the terminal 120.

The display apparatus 121 is configured to display the to-be-adjusted pixel according to the blue light output value set by the processor 124.

It should be noted that when the display apparatus 121 displays a pixel, not only blue light is included, but also light in another color is included. The light in another color is irrelevant to this embodiment of the present disclosure, and therefore only blue light is mentioned when a specific solution is described and description of the light in another color is ignored.

Optionally, the to-be-adjusted pixel displayed on the display apparatus 121 further includes all pixels displayed on the display apparatus 121, or some pixels displayed on the display apparatus 121.

The apparatus may adjust all pixels displayed on the display apparatus 121, or may identify some to-be-adjusted pixels displayed on the display apparatus 121, adjust the to-be-adjusted pixels, and display another pixel according to an original value. A specific implementation manner to be used may be defined according to an actual requirement, and this embodiment of the present disclosure does not impose a specific limitation. For example, the terminal 120 identifies, as a to-be-adjusted pixel, a pixel in a text (a black text on a white background, or a white text on a black background) area displayed on the display apparatus 121.

The memory 123 is configured to store the preset rule corresponding to the monitoring parameter.

According to the blue light adjustment terminal 120 provided in this embodiment of the present disclosure, the terminal 120 acquires the values of the one or more monitoring parameters, and the terminal 120 sets, according to the monitoring parameter, the blue light output value of the to-be-adjusted pixel displayed on the display apparatus 121 when a value of at least one of the monitoring parameters meets a preset rule corresponding to the monitoring parameter, where the blue light output value is less than the original blue light output value of the to-be-adjusted pixel, the display apparatus 121 displays the to-be-adjusted pixel according to the blue light output value such that the terminal 120 can determine, according to the value of the monitoring parameter, whether to adjust blue light of the display apparatus 121, and set, according to the monitoring parameter, the blue light output value of the to-be-adjusted pixel displayed on the display apparatus 121, and therefore the blue light can be adjusted intelligently, and an objective of vision protection without affecting user experience is achieved.

Optionally, the memory 123 is further configured to store a preset application program list, and the processor 124 is further configured to monitor an application program currently running on a foreground of the terminal 120, and set the blue light output value to the original blue light output value of the to-be-adjusted pixel when the application program is in the preset application program list stored in the memory 123 or when none of the values, of the one or more monitoring parameters, acquired by the monitoring parameter acquiring apparatus 122 meets the preset rule corresponding to the monitoring parameter.

It should be noted that the preset application program list is stored in the memory 123, and an application program that has a relatively high pixel output quality requirement is stored in this preset application program list, for example, a video player or a photo player.

When the application program is in the preset application program list stored in the memory 123, the blue light output value is set to the original blue light output value of the to-be-adjusted pixel, that is, adjustment on blue light of the to-be-adjusted pixel is stopped.

When none of the values of the monitoring parameters meets the preset rule that corresponds to the monitoring parameter and that is stored in the memory 123, the blue light output value is set to the original blue light output value of the to-be-adjusted pixel, that is, adjustment on blue light of the to-be-adjusted pixel is stopped.

According to the blue light adjustment terminal 120 provided in this embodiment of the present disclosure, a condition for stopping blue light adjustment is set, and the terminal 120 automatically determines whether blue light adjustment needs to be stopped such that the terminal 120 can intelligently stop blue light adjustment when blue light adjustment is unsuitable or blue light adjustment is not required, and an objective of vision protection without affecting user experience is achieved.

Optionally, the processor 124 is configured to determine a first adjustment parameter according to the monitoring parameter, and set the blue light output value of the to-be-adjusted pixel according to the first adjustment parameter such that the blue light output value is less than the original blue light output value of the to-be-adjusted pixel.

It should be noted that the terminal 120 may determine the first adjustment parameter according to one or more monitoring parameters, that is, the terminal 120 may determine the first adjustment parameter according to one monitoring parameter or may determine the first adjustment parameter according to multiple monitoring parameters. A specific quantity of monitoring parameters used as a basis for determining the first adjustment parameter may be set according to an actual requirement, and this embodiment of the present disclosure does not impose a specific limitation. Duration is used as an example to describe a detailed procedure for setting the blue light output value of the to-be-adjusted pixel according to the first adjustment parameter. For details, reference may be made to the method embodiments, and details are not described herein.

According to the blue light adjustment terminal 120 provided in this embodiment of the present disclosure, the terminal 120 determines the first adjustment parameter according to the monitoring parameter, and then the terminal 120 sets the blue light output value of the to-be-adjusted pixel according to the first adjustment parameter such that the blue light output value is less than the original blue light output value of the to-be-adjusted pixel. Therefore, the terminal 120 can intelligently perform blue light adjustment on the screen of the terminal 120 according to the monitoring parameter, and an objective of vision protection without affecting user experience is achieved.

Optionally, the processor 124 is further configured to determine a second adjustment parameter according to the first adjustment parameter, and the processor 124 is further configured to set the blue light output value of the to-be-adjusted pixel according to the first adjustment parameter and the second adjustment parameter such that the blue light output value of the to-be-adjusted pixel is closer to the original blue light output value of the to-be-adjusted pixel when the original blue light output value of the to-be-adjusted pixel is smaller. Duration is used as an example to describe a detailed procedure for setting the blue light output value of the to-be-adjusted pixel according to the first adjustment parameter and the second adjustment parameter. For details, reference may be made to the method embodiments, and details are not described herein.

According to the blue light adjustment terminal 120 provided in this embodiment of the present disclosure, the terminal 120 determines the first adjustment parameter according to the monitoring parameter, and then the terminal 120 determines the second adjustment parameter according to the first adjustment parameter, and finally the terminal 120 sets the blue light output value of the to-be-adjusted pixel according to the first adjustment parameter and the second adjustment parameter such that the blue light output value of the to-be-adjusted pixel is closer to the original blue light output value of the to-be-adjusted pixel when the original blue light output value of the to-be-adjusted pixel is smaller, and a display effect of the pixel is first ensured when less harm is caused to vision.

Optionally, the memory 123 is further configured to store a preset third adjustment parameter, and the processor 124 is further configured to set the blue light output value of the to-be-adjusted pixel according to the preset third adjustment parameter such that the blue light output value is less than the original blue light output value of the to-be-adjusted pixel.

It should be noted that, when identifying, as a to-be-adjusted pixel, a pixel in a text (a black text on a white background, or a white text on a black background) area displayed on the display apparatus 121, the terminal 120 may directly set a blue light output value of the to-be-adjusted pixel to a fixed value, for example, set the blue light output value of the to-be-adjusted pixel to 128.

According to the blue light adjustment terminal 120 provided in this embodiment of the present disclosure, after identifying the to-be-adjusted pixel, the terminal 120 directly sets the blue light output value of the to-be-adjusted pixel using the preset third adjustment parameter. Therefore a calculation step is not required, blue light adjustment of the to-be-adjusted pixel can be quickly completed, and an objective of vision protection without affecting user experience is achieved.

Hardware of the terminal 120 in this embodiment of the present disclosure may be configured to perform the procedure of the blue light adjustment method shown in FIG. 7A and FIG. 7B, and details of a specific operation procedure of the terminal 120 are not described herein. For details, reference may be made to description of the method embodiment.

Persons of ordinary skill in the art may understand that all or some of the steps of the method embodiments may be implemented by a program instructing relevant hardware. The program may be stored in a computer-readable storage medium. The steps of the method embodiments are performed when the program runs. The foregoing storage medium includes any medium that can store program code, such as a ROM, a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features of the technical solutions, without departing from the scope of the technical solutions of the embodiments of the present disclosure.

What is claimed is:

1. A blue light adjustment method, comprising:
   acquiring, by a terminal, values of monitoring parameters, the monitoring parameters comprising duration and system time, and the duration indicating a time length of a continuous awake state of a screen of the terminal;
   setting, by the terminal according to the monitoring parameters, a blue light output value of a to-be-adjusted pixel displayed on the screen of the terminal when a value of at least one of the monitoring parameters meets a preset rule corresponding to the monitoring parameter, the blue light output value being less than an original blue light output value of the to-be-adjusted pixel, a preset rule corresponding to the duration comprising that a value of the duration is greater than a preset duration threshold, and a preset rule corresponding to the system time comprising that the system time is within a preset time period;

displaying, by the screen of the terminal, the to-be-adjusted pixel according to the blue light output value; and comparing, by the terminal, the monitoring parameters one-by-one according to a preset priority order, the terminal continuing the comparison when one of the monitoring parameters does not meet a preset rule, and the terminal stopping the comparison when the one of the monitoring parameters meets the preset rule.

2. The blue light adjustment method of claim 1, further comprising:

monitoring an application program currently running on a foreground of the terminal; and setting the blue light output value to the original blue light output value of the to-be-adjusted pixel when the application program is in a preset application program list.

3. The blue light adjustment method of claim 1, wherein setting the blue light output value of the to-be-adjusted pixel displayed on the screen of the terminal comprises:

determining, by the terminal, a first adjustment parameter according to the monitoring parameter; and setting, by the terminal, the blue light output value of the to-be-adjusted pixel according to the first adjustment parameter such that the blue light output value is less than the original blue light output value of the to-be-adjusted pixel.

4. The blue light adjustment method of claim 3, wherein setting the blue light output value of the to pixel according to the first adjustment parameter comprises setting, by the terminal, the blue light output value of the to-be-adjusted pixel according to Pout(x)=A*Pin(x), A indicating the first adjustment parameter, Pin(x) indicating the original blue light output value of the to-be-adjusted pixel, Pout(x) indicating the blue light output value of the to-be-adjusted pixel, and 0<A<1.

5. The blue light adjustment method of claim 3, wherein after determining the first adjustment parameter, the blue, light adjustment method further comprises determining, by the terminal, a second adjustment parameter according to the first adjustment parameter, and setting the blue light output value of the to-be-adjusted pixel according to the first adjustment parameter comprises setting, by the terminal, the blue light output value of the to-be-adjusted pixel according to the first adjustment parameter and the second adjustment parameter such that the blue light output value of the to-be-adjusted pixel is closer to the original blue light output value of the to-be-adjusted pixel when the original blue light output value of the to-be-adjusted pixel is smaller.

6. The blue light adjustment method of claim 5, wherein setting the blue light output value of the to-be-adjusted pixel according to the first adjustment parameter and the second adjustment parameter comprises setting, by the terminal, the blue light output value of the to-be-adjusted pixel according to Pout(x)=A*Pin(x)+A*Pin(x)*(1−Pin(x)), A indicating the first adjustment parameter, G indicating the second adjustment parameter, Pin(x) indicating the original blue light output value of the to-be-adjusted pixel, Pout(x) indicating the blue light output value of the to-be-adjusted pixel, 0<A<1, and 1<G<10.

7. The blue light adjustment method of claim 1, wherein the blue light output value of the to-be-adjusted pixel displayed on the screen of the terminal comprises setting, by the terminal, the blue light output value of the to-be-adjusted pixel according to a preset third adjustment parameter such that the blue light output value is less than the original blue light output value of the to-be-adjusted pixel.

8. The blue light adjustment method of claim 1, wherein the to-be-adjusted pixel displayed on the screen of the terminal comprises all pixels displayed on the screen of the terminal.

9. The blue light adjustment method of claim 1, wherein the monitoring parameters further comprise:

ambient light luminance of the terminal;

a distance between an eye of a user and the screen of the terminal;

system time of the terminal;

a quantity of times the eye of the user closes per unit time;

a motion status of the terminal; and the original blue light output value of the to-be-adjusted pixel.

10. The blue light adjustment method of claim 1, wherein the monitoring parameters further comprise an ambient light luminance, and a preset rule corresponding to the ambient light luminance comprises that a value of the ambient light luminance is less than a preset ambient light threshold.

11. The blue light adjustment method of claim 1, wherein the monitoring parameters further comprise a distance between the eye of the user and the screen of the terminal, and a preset rule corresponding to the distance between the eye of the user and the screen of the terminal comprises that a value of the distance between the eye of the user and the screen of the terminal is less than a preset distance threshold.

12. The blue light adjustment method of claim 1, wherein the preset time period comprises a sunset time period acquired by the terminal from a network.

13. The blue light adjustment method of claim 1, wherein the monitoring parameters further comprise a quantity of times the eye of the user closes per unit time, and a preset rule corresponding to the quantity of times the eye of the user closes per unit time comprises that a value of the quantity of times the eye of the user closes per unit time is greater than a preset threshold of eye closing times.

14. The blue light adjustment method of claim 1, wherein the monitoring parameters further comprise a motion status of the terminal, and a preset rule corresponding to the motion status of the terminal comprises that the motion status of the terminal is a moving state.

15. The blue light adjustment method of claim 1, further comprising:

monitoring an application program currently running on a foreground of the terminal; and setting the blue light output value to the original blue light output value of the to-be-adjusted pixel when none of the values of the one or more monitoring parameters meets the preset rule corresponding to the monitoring parameter.

16. The blue light adjustment method of claim 1, wherein the to-be-adjusted pixel displayed on the screen of the terminal comprises some pixels displayed on the screen of the terminal.

17. The blue light adjustment method of claim 1, wherein the preset time period comprises a time period preset by the user.

18. A blue light adjustment terminal, comprising:

a receiver configured to acquire values of monitoring parameters, the monitoring parameters comprising duration and system time, and the duration indicating a time length of a continuous awake state of a screen of the terminal;

a processor coupled to the receiver and configured to:

set, when a value, of at least one of the monitoring parameters, acquired by the receiver meets a preset rule corresponding to the monitoring parameter, a blue light output value of a to-be-adjusted pixel according to the monitoring parameter, the blue light output value being less than an original blue light output value of the to-be-adjusted pixel, a preset rule corresponding to the duration comprising that a value of the duration is greater than a preset duration threshold, and a preset rule corresponding to the system time comprising that the system time is within a preset time period; and compare the monitoring parameters one-by-one according to a preset priority order, the processor continuing the comparison when one of the monitoring parameters does not meet a preset rule, and the processor stopping the comparison when the one of the monitoring parameters meets the preset rule;

a display apparatus coupled to the processor and configured to display the to-be-adjusted pixel according to the blue light output value; and a memory coupled to the processor and configured to store the preset rules corresponding to the monitoring parameters.

19. A blue light adjustment method, comprising:

acquiring, by a terminal, values of monitoring parameters, the monitoring parameters comprising duration and system time, and the duration indicating a time length of a continuous awake state of a screen of the terminal;

setting, by the terminal according to the monitoring parameters, a blue light output value of a to-be-adjusted pixel displayed on the screen of the terminal when a value of at least one of the monitoring parameters meets a preset rule corresponding to the monitoring parameter, the blue light output value being less than an original blue light output value of the to-be-adjusted pixel, a preset rule corresponding to the duration comprising that a value of the duration is greater than a preset duration threshold, a preset rule corresponding to the system time comprising that the system time is within a preset time period, and the preset time period comprising a sunset time period acquired by the terminal from a network; and displaying, by the screen of the terminal, the to-be-adjusted pixel according to the blue light output value.

* * * * *

UNITED STATES PATENT AND TRADEMARK OFFICE
CERTIFICATE OF CORRECTION

PATENT NO. : 10,332,484 B2
APPLICATION NO. : 15/509763
DATED : June 25, 2019
INVENTOR(S) : Ming-Yu Chen, Tao Zheng and Guo Le Page 1 of 1

It is certified that error appears in the above-identified patent and that said Letters Patent is hereby corrected as shown below:

In the Claims

Claim 4, Column 31, Line 32: "the to pixel" should read "the to-be-adjusted pixel"

Claim 5, Column 31, Line 41: "blue, light" should read "blue light"

Claim 6, Column 31, Line 58: "(1-Pin(x))," should read "(1-Pin(x)$^{1/G}$),"

Signed and Sealed this
Twentieth Day of August, 2019

Andrei Iancu
*Director of the United States Patent and Trademark Office*